United States Patent
Moriura et al.

(10) Patent No.: US 10,908,034 B2
(45) Date of Patent: Feb. 2, 2021

(54) PRESSURE-SENSITIVE ELEMENT AND STEERING DEVICE

(71) Applicant: Panasonic Intellectual Property Management Co., Ltd., Osaka (JP)

(72) Inventors: Yuta Moriura, Osaka (JP); Tetsuyoshi Ogura, Osaka (JP); Shinobu Masuda, Osaka (JP); Keiji Noine, Osaka (JP); Yui Sawada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/349,070

(22) PCT Filed: Nov. 2, 2017

(86) PCT No.: PCT/JP2017/039704
§ 371 (c)(1),
(2) Date: May 10, 2019

(87) PCT Pub. No.: WO2018/096901
PCT Pub. Date: May 31, 2018

(65) Prior Publication Data
US 2019/0277713 A1    Sep. 12, 2019

(30) Foreign Application Priority Data
Nov. 25, 2016   (JP) .................... 2016-229425

(51) Int. Cl.
*G01L 1/00* (2006.01)
*G01L 1/14* (2006.01)
(Continued)

(52) U.S. Cl.
CPC ............. *G01L 1/14* (2013.01); *B62D 1/046* (2013.01); *B62D 1/06* (2013.01); *G01L 5/00* (2013.01)

(58) Field of Classification Search
CPC .... G01L 1/14; G01L 5/00; B62D 1/06; B62D 1/046
(Continued)

(56) References Cited

U.S. PATENT DOCUMENTS 6,782,759 B2 *   8/2004   Shank .................... B60N 2/002
                                                      318/255
2007/0188179 A1   8/2007   Deangelis et al.
(Continued)

FOREIGN PATENT DOCUMENTS

GB       2443208       4/2008
JP     2009-526228     7/2009
(Continued)

OTHER PUBLICATIONS

International Search Report of PCT application No. PCT/JP2017/039704 dated Nov. 28, 2017.

*Primary Examiner* — Max H Noori
(74) *Attorney, Agent, or Firm* — McDermott Will and Emery LLP

(57) ABSTRACT

The present disclosure provides a pressure-sensitive element having a relatively wide pressing force measurement range and a relatively simple structure. Pressure-sensitive element is provided with pressure-sensitive part that receives pressing force and detector that detects the pressing force, and has a structure described below. That is, pressure-sensitive part has first conductive member that has elasticity, second conductive member, and dielectric body. Dielectric body is disposed between first conductive member and second conductive member, and at least partially covers the surface of first conductive member or second conductive member. Detector detects pressing force based on a variation in electrostatic capacitance between first conductive member and second conductive member.

19 Claims, 13 Drawing Sheets

(51) Int. Cl.
*B62D 1/06* (2006.01)
*G01L 5/00* (2006.01)
*B62D 1/04* (2006.01)

(58) Field of Classification Search
USPC .................................................. 73/862.626
See application file for complete search history.

(56) References Cited

U.S. PATENT DOCUMENTS

| | | |
|---|---|---|
| 2007/0188180 A1 | 8/2007 | Deangelis et al. |
| 2011/0308019 A1* | 12/2011 | Terawaki ............. A61B 5/6892 |
| | | 5/713 |
| 2013/0082970 A1 | 4/2013 | Frey et al. |
| 2016/0231098 A1* | 8/2016 | Otaka ..................... G06F 3/044 |
| 2016/0283007 A1 | 9/2016 | Ogura et al. |
| 2017/0269756 A1* | 9/2017 | Wang ................... G06F 3/0414 |
| 2017/0356812 A1* | 12/2017 | Madden ............... H03K 17/975 |
| 2018/0095568 A1* | 4/2018 | Yang .................... G06F 3/0412 |
| 2018/0157364 A1 | 6/2018 | Frey et al. |

FOREIGN PATENT DOCUMENTS

| | | |
|---|---|---|
| JP | 2010-203809 | 9/2010 |
| JP | 2011-102457 | 5/2011 |
| JP | 2013-529803 | 7/2013 |
| JP | 2013-178185 | 9/2013 |
| JP | 2014-190712 | 10/2014 |
| JP | 2014-235134 | 12/2014 |
| JP | 2015-114308 | 6/2015 |
| JP | 2016-031269 | 3/2016 |
| JP | 2016-183956 | 10/2016 |
| JP | 2016-193668 | 11/2016 |

\* cited by examiner

PRESSURE-SENSITIVE ELEMENT AND STEERING DEVICE

CROSS-REFERENCE TO RELATED APPLICATIONS

This application is a U.S. national stage application of the PCT International Application No. PCT/JP2017/039704 filed on Nov. 2, 2017, which claims the benefit of foreign priority of Japanese patent application No. 2016-229425 filed on Nov. 25, 2016, the contents all of which are incorporated herein by reference.

FIELD OF THE INVENTION

The present disclosure relates to a pressure-sensitive element and a steering device.

DESCRIPTION OF THE RELATED ART

Pressure-sensitive elements are widely used as pressure-sensitive sensors mounted to a portion touched by a human for detecting pressing force (contact pressure) in fields of industrial devices, robots, vehicles, and the like. Recently, with the development of computer control technologies and improvement in design properties, development is now under way of electronic devices having a variety of free-form surfaces, such as humanoid robots and automotive interior trims. In accordance with such development, high-performance pressure-sensitive elements are demanded to be mounted to free-form surfaces. For example, Patent Literatures 1 to 3 disclose background arts related to such technologies.

CITATION LIST

Patent Literatures

PTL 1: Unexamined Japanese Patent Publication No. 2011-102457
PTL 2: Unexamined Japanese Patent Publication No. 2015-114308
PTL 3: Unexamined Japanese Patent Publication No. 2014-190712

SUMMARY OF THE INVENTION

The inventors of the present application have found, as a result of their earnest studies, that a pressure-sensitive element used as an electrostatic capacitance pressure-sensitive sensor has points to be improved in a pressing force measurement range (dynamic range) and simplification of a structure.

More specifically, the configuration in PTL 1 detects pressing force by using a variation in electrostatic capacitance based on a change in distance between conductive threads, and thus, entails a problem of a relatively narrow pressing force measurement range.

The configuration in PTL 2 needs to connect detection elements with each other using a connecting part having a crank-shaped bend structure, and thus, is demanded to simplify the structure of a pressure-sensitive element.

In the configuration in PTL 3, a load sensor unit includes an elastomer base material, and a surface electrode and a back electrode provided on the front side and the back side of the base material, respectively, and detects pressing force based on a change in distance between the electrodes caused by pressing. Therefore, this configuration has a problem of a relatively narrow pressing force measurement range.

The present disclosure is accomplished in view of the foregoing circumstances. Specifically, an object of the present disclosure is to provide a pressure-sensitive element having a relatively wide pressing force measurement range and a relatively simple structure.

A pressure-sensitive element according to one aspect of the present disclosure is provided with a pressure-sensitive part that receives pressing force and a detector that detects the pressing force. The pressure-sensitive part has a first conductive member that has elasticity, a second conductive member, and a dielectric layer. The dielectric layer is disposed between the first conductive member and the second conductive member, and at least partially covers one of a surface of the first conductive member and a surface of the second conductive member. The detector detects pressing force based on a variation in electrostatic capacitance between the first conductive member and the second conductive member.

According to the present disclosure, a pressure-sensitive element having a relatively wide pressing force measurement range and a relatively simple structure can be obtained.

DESCRIPTION OF EMBODIMENTS DETAILED DESCRIPTION OF THE PREFERRED EMBODIMENTS

Figure 1A:
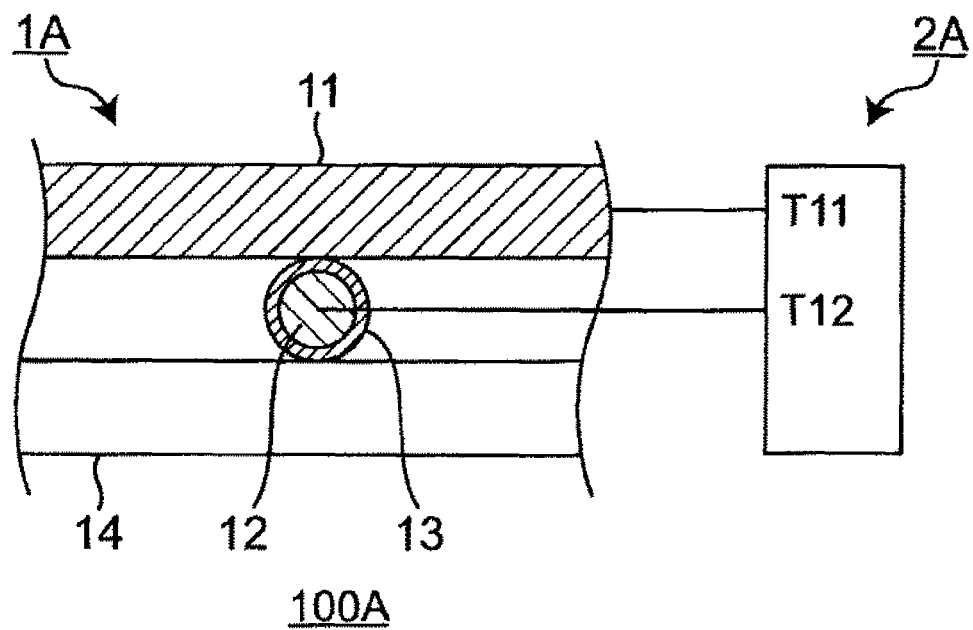
FIG. 1A is a sectional view schematically showing a configuration of a pressure-sensitive element according to a first exemplary embodiment of the present disclosure.

A pressure-sensitive element according to the present disclosure and use of the pressure-sensitive element will be described in detail with reference to the drawings.
[Pressure-Sensitive Element]

The pressure-sensitive element in the present disclosure is an element having capacitance, and has a capacitor function. When pressing force is applied, the pressure-sensitive element causes a variation in capacitance, and the pressing force is detected based on the variation in capacitance. Therefore, the pressure-sensitive element according to the present disclosure may also be referred to as an "electrostatic capacitance pressure-sensitive sensor element", a "capacitive pressure-detecting sensor element", or a "pressure-sensitive switch element", for example.

The pressure-sensitive element according to the present disclosure will be described below with reference to the drawings. Various elements are schematically shown in the drawings merely for the purpose of facilitating the understanding of the present disclosure, and it should be noted that their dimensional proportions and appearances could be different from actual ones. Note that a "top-bottom direction" directly or indirectly used in the present specification corresponds to the top-bottom direction in the drawings. The same reference marks or symbols indicate the same members or same meanings, unless otherwise specified. (First exemplary embodiment) to (Eleventh exemplary embodiment) and their modifications described below are exemplary embodiments and modifications of the pressure-sensitive element.

First Exemplary Embodiment

A configuration of pressure-sensitive element 100A according to the present exemplary embodiment is schematically shown in FIG. 1A. That is, FIG. 1A is a sectional view schematically showing the configuration of pressure-sensitive element 100A according to the first exemplary embodiment. Pressure-sensitive element 100A according to the present exemplary embodiment is provided with pressure-sensitive part 1A that receives pressing force and detector 2A that detects the pressing force.
(1a) Pressure-Sensitive Part 1A Pressure-sensitive part 1A has first conductive member 11, second conductive member 12, and dielectric body 13. In FIG. 1A, dielectric body 13 covers a surface of second conductive member 12. However, it may cover a surface of either first conductive member 11 or second conductive member 12.

Figure 1B:
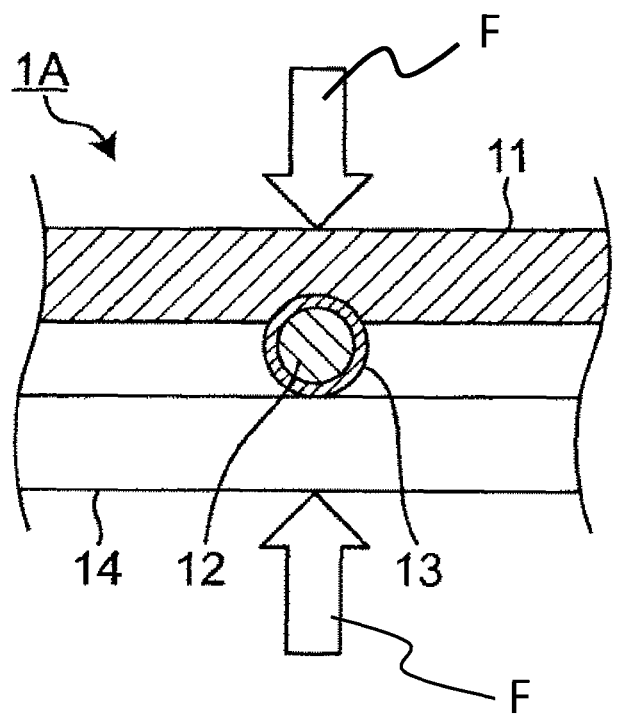
FIG. 1B is a sectional view schematically showing a configuration of a pressure-sensitive part of the pressure-sensitive element shown in FIG. 1A when pressing force is applied to the pressure-sensitive part.

FIG. 1B is a sectional view schematically showing a configuration of pressure-sensitive part 1A of pressure-sensitive element 100A shown in FIG. 1A when pressing force is applied to pressure-sensitive part 1A.

In pressure-sensitive element 100A in the present exemplary embodiment, when pressing force F is applied to pressure-sensitive part 1A as shown in FIG. 1B, an area of a contact region between dielectric body 13 and one (first conductive member 11 in FIGS. 1A and 1B) of first conductive member 11 and second conductive member 12 not covered with dielectric body 13 (such an area of a contact region may be merely referred to as an "area of a contact region" hereinafter) increases based on elasticity of first conductive member 11. As a result, electrostatic capacitance C [pF] between first conductive member 11 and second conductive member 12 varies. Electrostatic capacitance C [pF] and pressing force F [N] to be applied to the pressure-sensitive part are represented by following (Equation 1) and (Equation 2), respectively, and detector 2A detects pressing force F. In the present exemplary embodiment, pressing force F is detected based on a variation in the area of the contact region as described above.

[Equation 1]

$$C = \frac{\varepsilon S}{d} \quad \text{(Equation 1)}$$

[Equation 2]

$$F = E \cdot eS \quad \text{(Equation 2)}$$

In (Equation 1) and (Equation 2), ε [pF/m] is a dielectric constant of the dielectric body, S [m²] is a contact area between the conductive member not covered with the dielectric body and the dielectric body, d [m] is a thickness of the dielectric body, E [Pa] is a Young's modulus of the first conductive member, and e is strain of the first conductive member.

A conventional pressure-sensitive element detects pressing force F by detecting a variation in electrostatic capacitance C based on a variation in a distance between electrodes. Meanwhile, the pressure-sensitive element according to the present exemplary embodiment detects pressing force F by detecting a variation in electrostatic capacitance C based on a variation in the area of the contact region. The variation in the area of the contact region contributes more largely to the variation in electrostatic capacitance C than the variation in the distance between electrodes. Particularly when pressing force F is small, the distance between electrodes is nearly unchanged by application of pressing force F, and thus, the variation in electrostatic capacitance C based on the variation in the distance between electrodes is very small. On the other hand, even if pressing force F is small, the area of the contact region varies by application of pressing force F, and thus, the variation in electrostatic capacitance C based on the variation in the area of the contact region is large. This is because electrostatic capacitance C is proportional to the area of the contact region and inversely proportional to the distance between electrodes ($C \propto S$, $C \propto 1/d$). Therefore, the pressure-sensitive element in the present exemplary embodiment has wider measurement range of pressing force F than the conventional pressure-sensitive element.

Pressing force may be applied to pressure-sensitive part 1A of the pressure-sensitive element in the present exemplary embodiment from either a side of first conductive member 11 or a side of second conductive member 12. Generally, pressing force is applied from the side of first conductive member 11. FIG. 1B shows that the pressing force is applied from the side of first conductive member 11, and force is also exerted from a side of base material 14, which will be described later, due to reaction of the pressing force.

First conductive member 11 has elasticity and conductivity, and functions as an electrode. Elasticity means a property of locally deforming an object by external force and returning the shape of the object back to its original shape when the force is removed. The external force is normal pressing force to be applied to the pressure-sensitive element, and the magnitude thereof is about 0.1 N/cm$^2$ or more and about 100 N/cm$^2$ or less. Specifically, first conductive member 11 may have elasticity for increasing the area of the contact region between first conductive member 11 and dielectric body 13 due to the pressing force applied to the pressure-sensitive part. More specifically, first conductive member 11 may have an elastic modulus lower than that of dielectric body 13 so as to deform more than dielectric body 13 when being pressed. From the viewpoint of further expansion of the pressing force measurement range and improvement in pressure sensitivity, the elastic modulus of first conductive member 11 is preferably about 10$^4$ Pa or more and about 10$^8$ Pa or less, for example. By way of example, it is about 10$^6$ Pa. As the elastic modulus of first conductive member 11 is larger within the abovementioned range, the pressing force measurement range expands. As the elastic modulus of first conductive member 11 is smaller within the abovementioned range, the pressure sensitivity is improved. When the pressure sensitivity is improved, very small pressing force which has been conventionally difficult to be detected can be detected, for example. Thus, the start of the application of the pressing force can be detected with high precision. Regarding conductivity, a resistivity of first conductive member 11 may be sufficiently smaller than an impedance of capacitance within a desired frequency band. The resistivity can be adjusted by changing a relative proportion of a conductive filler and a resin material (rubber material) described later.

First conductive member 11 corresponds to an elastic electrode member, and may be referred to as a stretchable member. First conductive member 11 may be formed from any material, as long as it has both elasticity and conductivity as described above. For example, first conductive member 11 may be formed from a conductive resin having a resin material (particularly, a rubber material) and conductive fillers dispersed in the resin material. From the viewpoint of further expansion of the pressing force measurement range, first conductive member 11 is preferably formed from conductive rubber having a rubber material and conductive fillers dispersed in the rubber material. When first conductive member 11 is formed from conductive rubber, pressure-sensitive part 1A can effectively detect pressing force. In addition, when first conductive member 11 is formed from conductive rubber, pressure-sensitive part 1A can sense depression when being pressed. For example, the resin material may be at least one kind of resin material selected from the group consisting of styrene resin, silicon resin (for example, polydimethylpolysiloxane (PDMS)), acrylic resin, rotaxane resin, urethane resin, and the like. For example, the rubber material may be at least one kind of rubber material selected from the group consisting of silicon rubber, isoprene rubber, butadiene rubber, styrene-butadiene rubber, chloroprene rubber, nitrile rubber, polyisobutylene, ethylene propylene rubber, chlorosulfonated polyethylene, acrylic rubber, fluorine-contained rubber, epichlorohydrin rubber, urethane rubber, and the like. The conductive fillers may contain at least one kind of material selected from the group consisting of gold (Au), silver (Ag), copper (Cu), carbon (C), zinc oxide (ZnO), indium oxide (III) (In$_2$O$_3$), and tin oxide (IV) (SnO$_2$). A conductive layer may be used in place of or in addition to the conductive fillers. Specifically, first conductive member 11 may be formed such that a conductive layer is formed on a surface of a resin structure (particularly, rubber structure) made of the resin material (particularly, rubber material) mentioned above through application of conductive ink.

The thickness of first conductive member 11 is not particularly limited, as long as the electrostatic capacitance between first conductive member 11 and second conductive member 12 varies by external pressing force. It is generally from 100 μm to 10 cm inclusive, and preferably from 500 μm to 1 cm inclusive. By way of example, it is more preferably 1 mm.

First conductive member 11 generally has a sheet shape or a plate shape. However, first conductive member 11 may have any shape as long as at least a portion of first conductive member 11 is disposed at a position (for example, just above second conductive member 12 as shown in FIG. 1A) corresponding to second conductive member 12. For example, first conductive member 11 may have a long shape (for example, a linear shape).

First conductive member 11 is preferably connected to ground (0 V) of the detector from the viewpoint of preventing noise during the measurement of pressing force.

First conductive member 11 can be obtained with the method described below. For example, firstly, conductive fillers are added to a desired resin material (rubber material) solution or raw material solution to prepare a composite material. Then, the composite material is applied on a substrate for separation, dried, and cured (cross-linked) as needed, and then, separated from the substrate for separation to obtain the first conductive member.

First conductive member 11 can also be obtained with another method described below. For example, firstly, a desired resin material (rubber material) solution or raw material solution is applied on the substrate for separation and dried, and cured (cross-linked) as needed. Then, ink containing conductive fillers is applied onto the surface of the obtained resin layer (rubber layer) to form a conductive layer, and then, the resultant is separated from the substrate for separation. Thus, the first conductive member is obtained.

Second conductive member 12 is disposed in proximity to first conductive member 11. That is, second conductive member 12 is disposed to be in indirect contact with first conductive member 11 via dielectric body 13. Second conductive member 12 may be disposed to be in indirect contact with first conductive member 11 via dielectric body 13 and an air layer.

Second conductive member 12 has at least conductivity, and functions as a so-called electrode. Second conductive member 12 generally has flexibility, and may also have elasticity. Flexibility means a property of returning a shape of an object, which entirely deforms by external force, to its original shape when the force is removed. The external force is normal pressing force to be applied to the pressure-sensitive element, and the magnitude thereof is about 0.10 N/cm$^2$ or more and about 100 N/cm$^2$ or less. When having flexibility, second conductive member 12 has an elastic modulus of more than about 10$^8$ Pa, particularly an elastic modulus of more than 10$^8$ Pa and less than or equal to 10$^{12}$ Pa, for example. By way of example, second conductive member 12 has an elastic modulus of about 1.2×10$^{11}$ Pa. Regarding conductivity, second conductive member 12 may have a resistivity sufficiently smaller than an impedance of capacitance within a desired frequency band.

Second conductive member 12 may be formed from any material, as long as it has at least conductivity. When having flexibility, second conductive member 12 may be constituted by a metal body, or may be constituted by a glass body and a conductive layer formed on the surface of the glass body or conductive fillers dispersed in the glass body, for example. Alternatively, second conductive member 12 may be constituted by a resin body and a conductive layer formed on the surface of the resin body or conductive fillers dispersed in the resin body. The metal body is an electrode member formed from metal, and thus, second conductive member 12 may be substantially formed from metal. The metal body contains at least one kind of metal selected from the group consisting of gold (Au), silver (Ag), copper (Cu), Ni—Cr alloy (Nichrome), carbon (C), zinc oxide (ZnO), indium oxide (III) (In$_2$O$_3$) and tin oxide (IV) (SnO$_2$). The glass body is not particularly limited as long as it has a mesh structure composed of silicon oxide. For example, the glass body may contain at least one kind of glass material selected from the group consisting of quartz glass, soda-lime glass, borosilicate glass, lead glass, and the like. The resin body may contain at least one kind of resin material selected from the group consisting of styrene resin, silicon resin (for example, polydimethylpolysiloxane (PDMS)), acrylic resin, rotaxane resin, urethane resin, and the like. The conductive layer of the glass body or the resin body may be a layer formed by depositing at least one kind of metal selected from the group consisting of metals similar to the metals that can constitute the metal body, or a layer formed by applying conductive ink. The conductive fillers in the glass body or the resin body may contain at least one kind of metal selected from the group consisting of metals similar to the metals that can constitute the metal body. When having elasticity, second conductive member 12 may be formed from conductive rubber similar to that used for first conductive member 11.

Second conductive member 12 is normally a long member having a long shape (for example, a linear shape). When second conductive member 12 is a long member and formed from a metal body, second conductive member 12 corresponds to a metal line or a metal wire (for example, copper wire), and this configuration is preferable from the viewpoint of further expansion of the pressing force measurement range and improvement of pressure sensitivity. When second conductive member 12 is a long member, such a long member is preferably disposed without being applied with tensile force from the viewpoint of improvement in a method of mounting of the pressure-sensitive element to a curved surface. For example, the long member is preferably disposed in a wavy pattern along prescribed main direction x as shown in FIG. 1C.

Figure 1C:
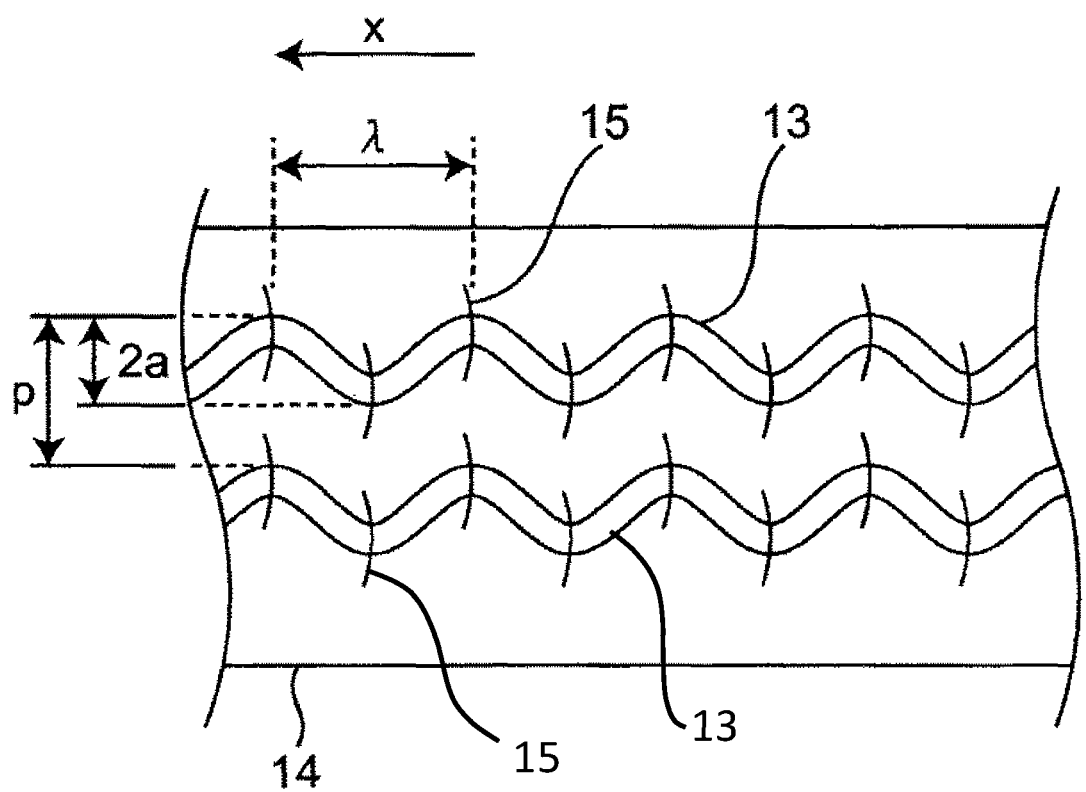
FIG. 1C is a view schematically showing one example of a shape of a second conductive member of the pressure-sensitive element shown in FIG. 1A in a plan view and one example of a restraint member for limiting displacement of the second conductive member, and is a plan view when a base material and the second conductive member are viewed from a second conductive member side.

FIG. 1C is a view schematically showing one example of a shape in a plan view (long shape and wavy pattern) of second conductive member 12 of pressure-sensitive element 100A shown in FIG. 1A, and is a plan view when a base material to be described later and the second conductive member are viewed from the second conductive member side. The shape in a plan view means a shape as viewed from top, and includes a perspective shape when the pressure-sensitive part in FIG. 1A is viewed in a perpendicular direction (for example, from top in FIG. 1A) relative to the sheet shape of the pressure-sensitive part.

Second conductive member 12 may be a heater element of the pressure-sensitive element. When second conductive member 12 is a heater element, the pressure-sensitive element provided with second conductive member 12 also functions as a heater. Specifically, when installed on a surface of a steering device (for example, a steering wheel), the pressure-sensitive element can heat hands gripping the steering device so that the hands do not get cold. Examples of a heater element include a nichrome wire.

The cross-sectional shape of second conductive member 12 is not particularly limited, as long as the area of the contact region is increased due to application of pressing force. For example, second conductive member 12 may have a circular shape as shown in FIG. 1A, an elliptical shape, a triangular shape, or the like.

The cross-sectional dimension of second conductive member 12 is not particularly limited, as long as the electrostatic capacitance between second conductive member 12 and first conductive member 11 can be measured. It is generally from 1 μm to 10 mm inclusive, and preferably from 100 μm to 1 mm inclusive from the viewpoint of further expansion of the pressing force measurement range and improvement in pressure sensitivity. By way of example, it is more preferably 300 μm. When the cross-sectional dimension of second conductive member 12 is decreased, a variation in the area of the contact region increases, which leads to improvement of pressure sensitivity. When the cross-sectional dimension of the long member is increased, the pressing force measurement range is further expanded. The cross-sectional shape of second conductive member 12 is the maximum dimension of the cross-sectional shape. Specifically, supposing that second conductive member 12 has a linear shape, the cross-sectional dimension of second conductive member 12 means the maximum dimension (for example, diameter) of the cross-section perpendicular to the longitudinal direction.

Particularly when second conductive member 12 is a long member, a plurality of second conductive members 12 is generally used. In such a case, patterning is possible by detecting, using the detector, a variation in capacitance between each of the plurality of second conductive members 12 and first conductive member 11. The patterning means detecting a pressed position together with pressing force. The patterning is also possible by dividing first conductive member 11.

When a plurality of long members is used for second conductive member 12, distance (pitch) p (FIG. 1C) between the adjacent long members is generally from 1 mm to 30 mm inclusive. When the long members are used in a steering device, pitch p is preferably from 2 mm to 10 mm inclusive, and by way of example, it is more preferably 5 mm. When a plurality of long members is used in a wavy pattern for second conductive member 12, wavelength λ (FIG. 1C) of the wavy pattern is generally from 1 mm to 40 mm inclusive. When the long members are used in a steering device, wavelength λ is preferably from 2 mm to 20 mm inclusive, and by way of example, it is more preferably 10 mm. Further, amplitude a (FIG. 1C) of the wavy pattern is generally from 1 mm to 20 mm inclusive. When the long members are used in a steering device, amplitude a is preferably from 2 mm to 10 mm inclusive, and by way of example, it is more preferably 5 mm.

In FIG. 1A, dielectric body 13 covers the entire surface of second conductive member 12. However, a coverage region of dielectric body 13 is not particularly limited, as long as dielectric body 13 at least partially covers the surface of first conductive member 11 or second conductive member 12. The state where dielectric body 13 at least partially covers the surface of first conductive member 11 or second conductive member 12 indicates a state where dielectric body 13 covers at least a region between first conductive member 11 and second conductive member 12 in the surface of first conductive member 11 or second conductive member 12. In other words, dielectric body 13 may at least partially cover the surface of first conductive member 11 or second conductive member 12, as long as it is present between first conductive member 11 and second conductive member 12. Regarding dielectric body 13, "covering" means that dielectric body 13 is integrated with, while being in close contact with, the surface of first conductive member 11 or second conductive member 12.

It is preferable that dielectric body 13 completely covers the entire surface of first conductive member 11 or second conductive member 12 from the viewpoint of further simplification of the structure of the pressure-sensitive element. It is preferable that dielectric body 13 completely covers the entire surface of second conductive member 12 from the viewpoint of further simplification of the structure of the pressure-sensitive element and easy availability of materials of the pressure-sensitive element. When dielectric body 13 completely covers the entire surface of second conductive member 12, dielectric body 13 constitutes an insulating film of second conductive member 12 so that dielectric body 13 and second conductive member 12 are generally integrated. Integrated dielectric body 13 and second conductive member 12 may correspond to an insulation-coated metal wire, and may be an enamel wire or an element wire, for example. If the insulation-coated metal wire is used, the pressure-sensitive element can be obtained by only disposing the insulation-coated metal wire between first conductive member 11 and base material 14 without a need of a photolithographic process such as etching, whereby simplification of the structure of the pressure-sensitive element can be achieved more satisfactorily, and further, production cost is decreased.

Dielectric body 13 may be formed from any material, as long as it has at least properties as a "dielectric body". For example, dielectric body 13 may contain a resin material, a ceramic material, and/or a metal oxide material. By way of example, dielectric body 13 may be formed from at least one kind of resin material selected from the group consisting of polypropylene resin, polyester resin (for example, polyethylene terephthalate), polyimide resin, polyphenylene sulfide resin, polyvinyl formal resin, polyurethane resin, polyamide-imide resin, polyamide resin, and the like. Dielectric body 13 may also be formed from at least one kind of metal oxide material selected from the group consisting of $Al_2O_3$, $Ta_2O_5$, and the like. Dielectric body 13 is generally formed from a material having a resistance value higher than the impedance of the capacitance within a desired frequency band.

Dielectric body 13 generally has rigidity. Rigidity means a property of resisting deformation caused by external force. The external force is normal pressing force to be applied to the pressure-sensitive element, and the magnitude thereof is about 0.1 N/cm² or more and about 100 N/cm² or less, for example. Generally, dielectric body 13 does not deform by normal pressing force as described above. Dielectric body 13 may have an elastic modulus higher than that of first conductive member 11 so as not to deform more than first conductive member 11 when pressing force is applied to the pressure-sensitive part. For example, when the elastic modulus of first conductive member 11 is about $10^4$ Pa or higher and about $10^8$ Pa or less, dielectric body 13 may have an elastic modulus higher than the elastic modulus of first conductive member 11.

The thickness of dielectric body 13 is not particularly limited, as long as the electrostatic capacitance between first conductive member 11 and second conductive member 12 varies by external pressing force. It is generally from 20 nm to 2 mm inclusive. When dielectric body 13 is used in a steering device, the thickness of dielectric body 13 is preferably from 20 nm to 1 mm inclusive, and by way of example, it is more preferably 10 μm.

When being formed from a resin material, dielectric body 13 can be formed by a coating method for applying and drying a resin material solution, and an electrodeposition method for performing electrodeposition in a resin material solution, for example.

When being formed from a metal oxide material, dielectric body 13 can be formed by an anodic oxidation method, for example.

Pressure-sensitive part 1A may further have base material 14 on an opposite side of second conductive member 12 from first conductive member 11. Base material 14 may be formed from any material, as long as it does not interfere the variation in electrostatic capacitance between first conductive member 11 and second conductive member 12. Base material 14 is preferably a stretchable member having stretching properties from the viewpoint of improvement in a method of mounting of the pressure-sensitive element to a curved surface. The stretchable member may be formed from any of rubber materials (particularly, conductive rubber) similar to those described above for first conductive member 11, and by way of example, the stretchable member includes silicone rubber.

The thickness of base material 14 is not particularly limited, and may be within a range similar to the range of the thickness of first conductive member 11 described above.

Pressure-sensitive part 1A may further have a restraint member 15 (see FIG. 1C) for limiting displacement of second conductive member 12 in the pressure-sensitive part. Restraint member 15 is not necessarily fix second conductive member 12 to a predetermined position of the pressure-sensitive part. Restraint member 15 may have restraining force enough for holding second conductive member 12 at a predetermined position. Since the pressure-sensitive part has the restraint member, displacement of second conductive member 12 can be prevented, and as a result, pressing force can be reliably detected at a predetermined position. In addition, when the pressure-sensitive element is mounted to a curved surface, distortion or the like is easy to be alleviated, and thus, damage can be prevented.

In FIG. 1C, restraint member 15 restrains second conductive member 12 on base material 14. However, restraint member 15 may restrain second conductive member 12 on at least first conductive member 11 and/or base material 14. In other words, restraint member 15 may restrain second conductive member 12 on one of or both of first conductive member 11 and base material 14. The state where restraint member 15 restrains second conductive member 12 on both of them means that first conductive member 11, second conductive member 12, and base material 14 are integrated in a state where second conductive member 12 is disposed between first conductive member 11 and base material 14.

Specific examples of restraint member 15 include a thread member, a partition, and an adhesive. Restraint member 15 is preferably a thread member. When restraint member 15 is a thread member, further simplification of the structure of the pressure-sensitive element can be achieved, while displacement of second conductive member 12 is prevented, and further, a method of mounting of the pressure-sensitive element to a curved surface is improved.

The thread member is not particularly limited, as long as it is long and thin and flexible enough to sew second conductive member 12 on first conductive member 11 or base material 14 as shown in FIG. 1C. The thread member may be conductive or non-conductive. Second conductive member 12 may be sewn on first conductive member 11 and/or base material 14 with the thread member. In other words, second conductive member 12 may be sewn on either first conductive member 11 or base material 14 or on both of them with the thread member. The state where second conductive member 12 is sewn on both of first conductive member 11 and base material 14 with the thread member means that first conductive member 11, second conductive member 12, and base material 14 are integrated by sewing second conductive member 12, which is disposed between first conductive member 11 and base material 14, on first conductive member 11 and base material 14.

Specific examples of the thread member include: a member formed by stretching and twisting natural or synthetic fibers; a fishing line; or a metallic yarn. For example, second conductive member 12 may be sewn at regular positions with the thread member as shown in FIG. 1C, or may be sewn at any random positions.

Sewing second conductive member 12 on first conductive member 11 or base material 14 with the thread member may be achieved by straight stitch (running stitch) or achieved by using a sewing machine which uses a needle thread and a bobbin thread. When second conductive member 12 is sewn with the thread member by using a sewing machine, the thread member is composed of a needle thread and a bobbin thread, and the needle thread and the bobbin thread are engaged with each other. When second conductive member 12 is sewn on either of first conductive member 11 or base material 14, the engagement part between the needle thread and the bobbin thread is located inside first conductive member 11 or base material 14. When second conductive member 12 is sewn on both first conductive member 11 and base material 14, the engagement part between the needle thread and the bobbin thread is located between first conductive member 11 and base material 14.

The partition is a member that is provided to erect between first conductive member 11 and base material 14 substantially parallel to the thickness direction for separating first conductive member 11 and base material 14 from each other to form a space. The partition holds second conductive member 12 within a predetermined space. The partition may be formed from any of rubber materials (particularly, rubber materials (that is, elastomer materials)) similar to those described above for first conductive member 11, and by way of example, the partition includes silicone rubber. In a plan view, the partition may be formed in a dotted pattern or may be continuously linearly formed. The partition may function as a spacer to be described below.

Pressure-sensitive part 1A may further have a spacer between first conductive member 11 and base material 14 for ensuring a gap therebetween. When pressure-sensitive part 1A has a spacer, first conductive member 11 is quickly returned to the original shape after the pressing force is removed, whereby detection speed and response speed of pressing force are increased. In a plan view, the spacer may be formed in a dotted pattern or may be continuously linearly formed. The spacer may be formed from any of resin materials (particularly, rubber materials (that is, elastomer materials)) similar to those described above for first conductive member 11, and by way of example, the spacer includes silicone rubber.

(1b) Detector 2A

Detector 2A is a circuit for detecting pressing force based on a variation in electrostatic capacitance between first conductive member 11 and second conductive member 12. Detector 2A is electrically connected to a wire leading from first conductive member 11 and a wire leading from second conductive member 12 via terminals T11 and T12, respectively. Detector 2A may be a control circuit, integrated circuit, and the like. First conductive member 11 is preferably connected to earth (ground) of detector 2A from the viewpoint of stabilizing pressing force detection due to reduction in an influence of noise. Specifically, it is preferable that terminal T11 of detector 2A to which the wire leading from first conductive member 11 is electrically connected is further connected to earth (ground).

When a plurality of second conductive members 12 is used, detector 2A has a plurality of terminals that is electrically connected to wires leading from the plurality of second conductive members 12, respectively.

(1c) Measurement of Pressing Force with Pressure-Sensitive Element 100A

Pressure-sensitive element 100A according to the present exemplary embodiment measures a variation in electrostatic capacitance between terminals T11 and T12 based on a variation in the area of the contact region to thereby measure pressing force without deforming dielectric body 13. The variation in the area of the contact region is larger than a variation in distance between electrodes in a conventional pressure-sensitive element, particularly when pressing force is small, and thus, the present exemplary embodiment enables measurement of a wide range of pressing force with a simple structure.

(Modifications)

Figure 1D:
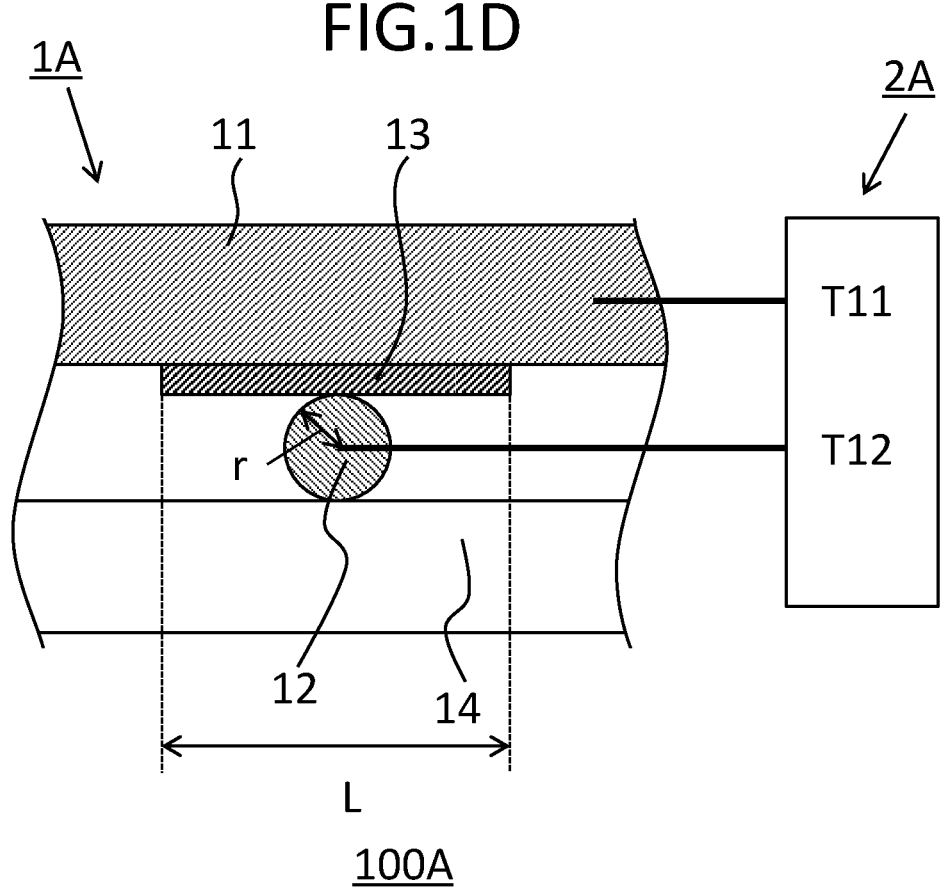
FIG. 1D is a sectional view schematically showing a configuration of a pressure-sensitive element according to a modification of the first exemplary embodiment of the present disclosure.

A configuration of pressure-sensitive element 100A according to a modification of the present exemplary embodiment is schematically shown in FIG. 1D. This pressure-sensitive element has a configuration in which, instead of covering second conductive member 12 with dielectric body 13, dielectric body 13 is formed on a part corresponding to second conductive member 12 in a principal surface of first conductive member 11. The other configurations are the same as those of pressure-sensitive element 100A shown in FIG. 1A.

Figure 1E:
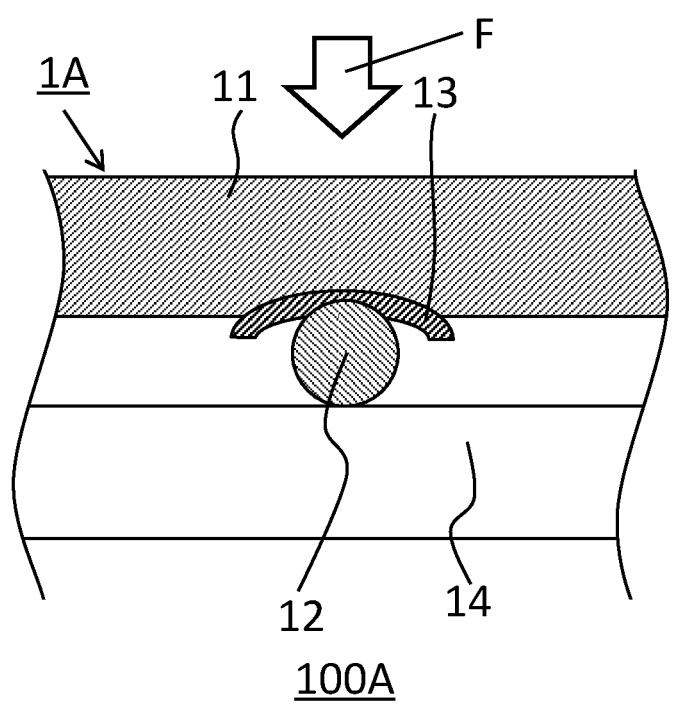
FIG. 1E is a sectional view schematically showing a configuration of a pressure-sensitive part of the pressure-sensitive element shown in FIG. 1D when pressing force is applied to the pressure-sensitive part.

FIG. 1E is a sectional view schematically showing a configuration of a pressure-sensitive part of the pressure-sensitive element shown in FIG. 1D when pressing force is applied to the pressure-sensitive part. As shown in FIG. 1E, when pressing force F is applied to pressure-sensitive part 1A of pressure-sensitive element 100A according to the present modification, a contact area between dielectric body 13 and second conductive member 12 increases. As a result, electrostatic capacitance C [pF] between first conductive member 11 and second conductive member 12 varies. Electrostatic capacitance C [pF] and pressing force F [N] to be applied to the pressure-sensitive part are represented by (Equation 1) and (Equation 2) described above, respectively, and detector 2A detects pressing force F.

Note that, dielectric body 13 needs to be configured such that, when pressing force F is applied to pressure-sensitive part 1A, first conductive member 11 is not brought in contact with second conductive member 12. Otherwise, electrostatic capacitance C between first conductive member 11 and second conductive member 12 cannot be measured. To this end, pressure-sensitive element 100A shown in FIG. 1D desirably satisfies (Equation 3) where the length of dielectric body 13 along a direction parallel to the principal surface of first conductive member 11 is defined as L, and the radius of the conductive member is defined as r.

[Equation 3]

$$L \geq 2\pi r \quad \text{(Equation 3)}$$

Note that π represents a circle ratio.

Second Exemplary Embodiment

Figure 2:
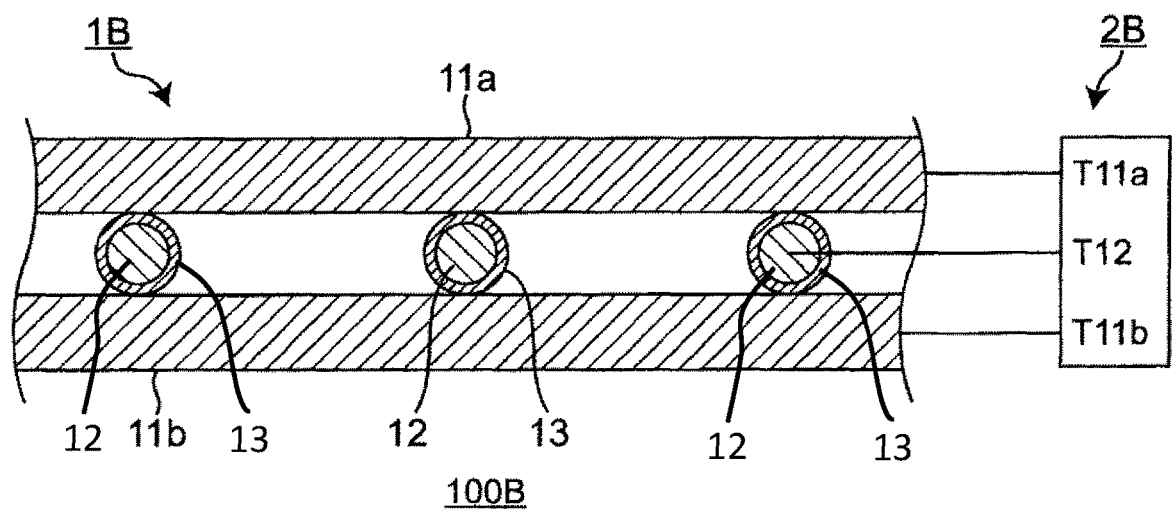
FIG. 2 is a sectional view schematically showing a configuration of a pressure-sensitive element according to a second exemplary embodiment of the present disclosure.

A configuration of pressure-sensitive element 100B according to the present exemplary embodiment is schematically shown in FIG. 2. That is, FIG. 2 is a sectional view schematically showing the configuration of pressure-sensitive element 100B according to the second exemplary embodiment. Pressure-sensitive element 100B according to the present exemplary embodiment is provided with pressure-sensitive part 1B that receives pressing force and detector 2B that detects the pressing force.

(2a) Pressure-Sensitive Part 1B

Pressure-sensitive part 1B is one exemplary embodiment of a configuration in which first conductive members and second conductive members are alternately stacked, and is the same as pressure-sensitive part 1A in the first exemplary embodiment except for the following items (1B-1) and (1B-2).

(1B-1)

Pressure-sensitive part 1B has two first conductive members which hold second conductive member 12 from both sides. In FIG. 2, the two first conductive members of pressure-sensitive part 1B are represented by reference marks 11a and 11b, respectively, and they may be independently selected from a range similar to the range of first conductive member 11 of pressure-sensitive part 1A. First conductive members 11a and 11b are preferably formed from conductive rubber, and preferably have a sheet shape. The conductive rubber may be the same as the conductive rubber described as a constituent material of first conductive member 11 of pressure-sensitive part 1A.

(1B-2)

Second conductive member 12 has dielectric body 13 covering its surface. It is preferable that dielectric body 13 completely covers the entire surface of second conductive member 12. A plurality of second conductive members 12 is preferably used. Each of the plurality of second conductive members 12 preferably has dielectric body 13 completely covering the entire surface.

(2b) Detector 2B

Detector 2B is the same as detector 2A in the first exemplary embodiment except for the following item (2B-1).

(2B-1)

Detector 2B is electrically connected to wires leading from first conductive members 11a and 11b and a wire leading from second conductive member 12 via terminals T11a, T11b, and T12, respectively. For example, two first conductive members 11a and 11b are electrically connected to each other via detector 2B. First conductive members 11a and 11b are preferably connected to earth (ground) of detector 2B from the viewpoint of stabilizing pressing force detection due to reduction in an influence of noise. Specifically, it is preferable that terminals T11a and T11b of detector 2B to which the wires leading from first conductive members 11a and 11b are electrically connected are further connected to earth (ground).

In FIG. 2, detector 2B has only one terminal T12 to be electrically connected to the wire leading from one of the plurality of second conductive members 12. However, detector 2B generally has a plurality of terminals T12 to be electrically connected to wires leading from the plurality of second conductive members 12. That is, second conductive members 12 are all connected to detector 2B via wires and terminals.

(2c) Measurement of Pressing Force with Pressure-Sensitive Element 100B

Pressure-sensitive element 100B according to the present exemplary embodiment can measure pressing force by measuring variations in electrostatic capacitance between various combinations of terminals.

For example, pressure-sensitive element 100B can measure pressing force by measuring one or more variations selected from the group consisting of a variation in electrostatic capacitance between terminal T11a and terminal T11b, a variation in electrostatic capacitance between terminal T11a and terminal T12, and a variation in electrostatic capacitance between terminal T12 and terminal T11b.

From the viewpoint of improving pressure sensitivity, it is preferable that pressing force is measured by measuring two or more variations selected from the abovementioned group, preferably the variation in electrostatic capacitance between terminal T11a and terminal T12 and the variation in electrostatic capacitance between terminal T12 and terminal T11b.

When pressure-sensitive element 100B according to the present exemplary embodiment uses first conductive member 11a and first conductive member 11b which are different in elastic modulus (Young's modulus), the pressing force measurement range can be further expanded. For example, when the elastic modulus of first conductive member 11a is relatively low and the elastic modulus of first conductive member 11b is relatively high, first conductive member 11a deforms and contracts first, and then, first conductive member 11b deforms. Therefore, the pressing force measurement range is further expanded.

Pressure-sensitive element 100B according to the present exemplary embodiment also measures a variation in electrostatic capacitance between the terminals based on a variation in an area of a contact region to thereby measure pressing force without deforming dielectric body 13, and thus, enables measurement of a relatively wide range of pressing force with a relatively simple structure.

Pressure-sensitive element 100B according to the present exemplary embodiment uses two first conductive members, first conductive member 11a and first conductive member 11b. Therefore, pressing force can be stably detected with little influence of noise.

In pressure-sensitive element 100B according to the present exemplary embodiment, when one of the electrodes having larger disturbing noise is grounded (0 V potential), the pressure-sensitive element is further resistant to noise. One of the electrodes having larger disturbing noise is generally an electrode on the upstream side in a pressing direction. However, when a conductor is present on the electrode on the upstream side in the pressing direction, an electrode on the downstream side in the pressing direction is the electrode having larger disturbing noise. That is, examples of the electrode having larger disturbing noise include the electrode on the upstream side in the pressing direction if a conductor is not present on the upstream electrode, and the electrode on the downstream side in the pressing direction if a conductor is present on the upstream electrode.

For example, when: only a variation in electrostatic capacitance between terminal T11a and terminal T11b is measured; only a variation in electrostatic capacitance between terminal T11a and terminal T12 is measured; and a variation in electrostatic capacitance between terminal T11a and terminal T12 and a variation in electrostatic capacitance between terminal T12 and terminal T11b are measured, first conductive member 11a is grounded (0 V potential).

When only a variation in electrostatic capacitance between terminal T12 and terminal T11b is measured, first conductive member 11b is grounded (0 V potential).

Thus, noise is prevented during the measurement of pressing force.

Now, the definitions of upstream side and downstream side in the pressing direction mentioned above are described. For example, consider the case where an electrode on a predetermined position of the surface of the pressure-sensitive element is pressed by a human hand. In such a case, pressing force is transmitted to the inside of the pressure-sensitive element from the electrode. The direction in which the pressing force is transmitted is referred to as a pressing direction. Specifically, the upstream side in the pressing direction is on the electrode side, and the downstream side in the pressing direction is the interior side of the pressure-sensitive element.

The reason why the electrode on the downstream side in the pressing direction has larger disturbing noise than the electrode on the upstream side when a conductor is present on the electrode on the upstream side will be described.

Generally, disturbing noise is large on the electrode on the upstream side in the pressing direction due to parasitic capacitance of a human hand. However, if a conductor is present on the electrode on the upstream side in the pressing direction, the potential of the electrode on the upstream side in the pressing direction can be set to 0 V by grounding the conductor, and thus, disturbing noise due to the parasitic capacitance of the human hand can be canceled. Therefore, in this case, disturbing noise is larger on the electrode on the downstream side in the pressing direction.

Third Exemplary Embodiment

Figure 3:
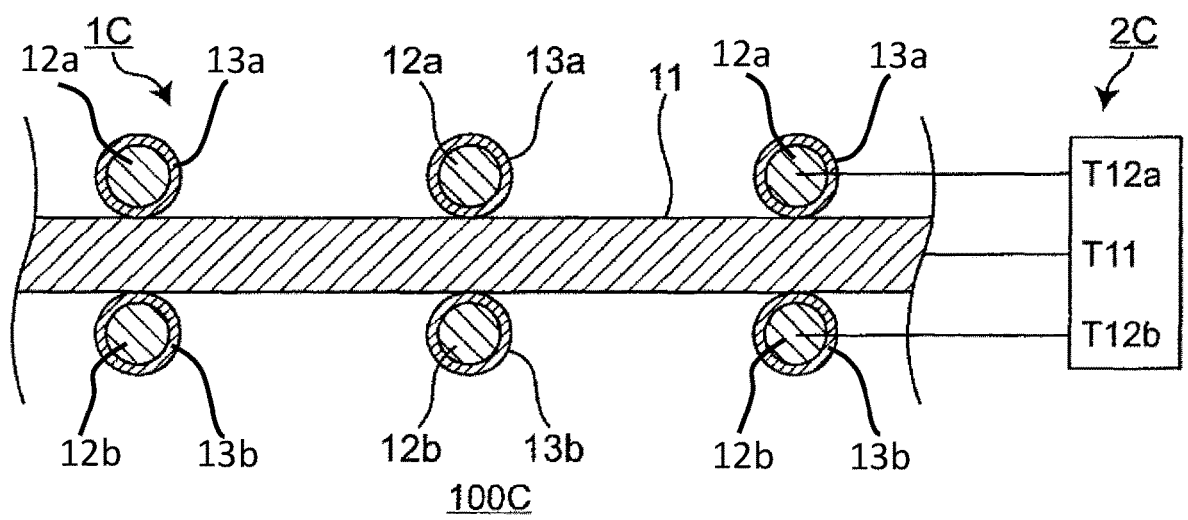
FIG. 3 is a sectional view schematically showing a configuration of a pressure-sensitive element according to a third exemplary embodiment of the present disclosure.

A configuration of pressure-sensitive element 100C according to the present exemplary embodiment is schematically shown in FIG. 3. That is, FIG. 3 is a sectional view schematically showing the configuration of pressure-sensitive element 100C according to the third exemplary embodiment. Pressure-sensitive element 100C according to the present exemplary embodiment is provided with pressure-sensitive part 1C that receives pressing force and detector 2C that detects the pressing force.

(3a) Pressure-Sensitive Part 1C

Pressure-sensitive part 1C is one exemplary embodiment of a configuration in which first conductive members and second conductive members are alternately stacked, and is the same as pressure-sensitive part 1A in the first exemplary embodiment except for the following item (1C-1).

(1C-1)

Pressure-sensitive part 1C has second conductive members which hold first conductive member 11 from both sides. In FIG. 3, the two second conductive members on each side of first conductive member 11 are represented by reference marks 12a and 12b, respectively, and they may be independently selected from a range similar to the range of second conductive member 12 of pressure-sensitive part 1A. It is preferable that both second conductive member 12a and second conductive member 12b respectively have dielectric bodies 13a and 13b that completely cover the entire surfaces. Dielectric bodies 13a and 13b may be independently selected from a range similar to the range of dielectric body 13 of pressure-sensitive part 1A.

(3b) Detector 2C

Detector 2C is the same as detector 2A in the first exemplary embodiment except for the following item (2C-1).

(2C-1)

Detector 2C is electrically connected to a wire leading from first conductive member 11 and wires leading from second conductive members 12a and 12b via terminals T11, T12a, and T12b, respectively. Second conductive member 12a is preferably connected to earth (ground) of detector 2C from the viewpoint of stabilizing pressing force detection due to reduction in an influence of noise. Specifically, it is preferable that terminal T12a of detector 2C to which the wire leading from second conductive member 12a is electrically connected is further connected to ground.

FIG. 3 shows that detector 2C has only one terminal (terminal T12a or terminal T12b) to be electrically connected to the wire leading from one of a plurality of second conductive members 12a or one of a plurality of second conductive members 12b which is on each side of first conductive member 11. However, detector 2C generally has a plurality of terminals (terminals T12a or terminals T12b) to be electrically connected to wires leading from the plurality of second conductive members 12a or the plurality of second conductive members 12b on each side of first conductive member 11. That is, second conductive members 12a or second conductive members 12b on each side of first conductive member 11 are all connected to detector 2C via wires and terminals.

(3c) Measurement of Pressing Force with Pressure-Sensitive Element 100C

Pressure-sensitive element 100C according to the present exemplary embodiment can measure pressing force by measuring variations in electrostatic capacitance between various combinations of terminals.

For example, pressure-sensitive element 100C can measure pressing force by measuring one or more variations selected from the group consisting of a variation in electrostatic capacitance between terminal T12a and terminal T12b, a variation in electrostatic capacitance between terminal T12a and terminal T11, and a variation in electrostatic capacitance between terminal T11 and terminal T12b.

From the viewpoint of improving pressure sensitivity, it is preferable that pressing force is measured by measuring two or more variations selected from the abovementioned group, preferably the variation in electrostatic capacitance between terminal T12a and terminal T11 and the variation in electrostatic capacitance between terminal T11 and terminal T12b.

When a variation in electrostatic capacitance is measured using terminal T12a and terminal T12b during measurement of variations in electrostatic capacitance between various combinations of terminals, a pressed position can be detected together with pressing force by allowing a principle direction of second conductive member 12a to cross a principle direction of second conductive member 12b. Measurement of a variation in electrostatic capacitance using terminal T12a and terminal T12b includes: measurement of only a variation in electrostatic capacitance between terminal T12a and terminal T12b; and measurement of a variation in electrostatic capacitance between terminals including one of terminal T12a and terminal T12b and a variation in electrostatic capacitance between terminals including the other one.

From the viewpoint of easily extending wires, pressing force is preferably measured by measuring only a variation in electrostatic capacitance between terminal T12a and terminal T12b.

Pressure-sensitive element 100C according to the present exemplary embodiment also measures a variation in electrostatic capacitance between the terminals based on a variation in an area of a contact region to thereby measure pressing force without deforming dielectric bodies 13a and 13b, and thus, enables measurement of a relatively wide range of pressing force with a relatively simple structure.

When the electrode having larger disturbing noise is grounded (0 V potential), pressure-sensitive element 100C according to the present exemplary embodiment is also resistant to noise, as in pressure-sensitive element 100B.

For example, when: only a variation in electrostatic capacitance between terminal T12a and terminal T12b is measured; only a variation in electrostatic capacitance between terminal T12a and terminal T11 is measured; and a variation in electrostatic capacitance between terminal T12a and terminal T11 and a variation in electrostatic capacitance between terminal T11 and terminal T12b are measured, second conductive member 12a is grounded (0 V potential).

When only a variation in electrostatic capacitance between terminal T11 and terminal T12b is measured, for example, first conductive member 11 is grounded (0 V potential).

Thus, noise is prevented during the measurement of pressing force.

In addition, when opposing portions of the pressure-sensitive element are sandwiched between 0 V potentials, the pressure-sensitive element is resistant to external noise. Specifically, second conductive member 12a and second conductive member 12b are set to have a potential of 0 V. Thus, noise is prevented during the measurement of pressing force.

In pressure-sensitive element 100C according to the present exemplary embodiment, a base material same as base material 14 of pressure-sensitive element 100A may be disposed over second conductive member 12a and/or under second conductive member 12b in FIG. 3.

Fourth Exemplary Embodiment

Figure 4:
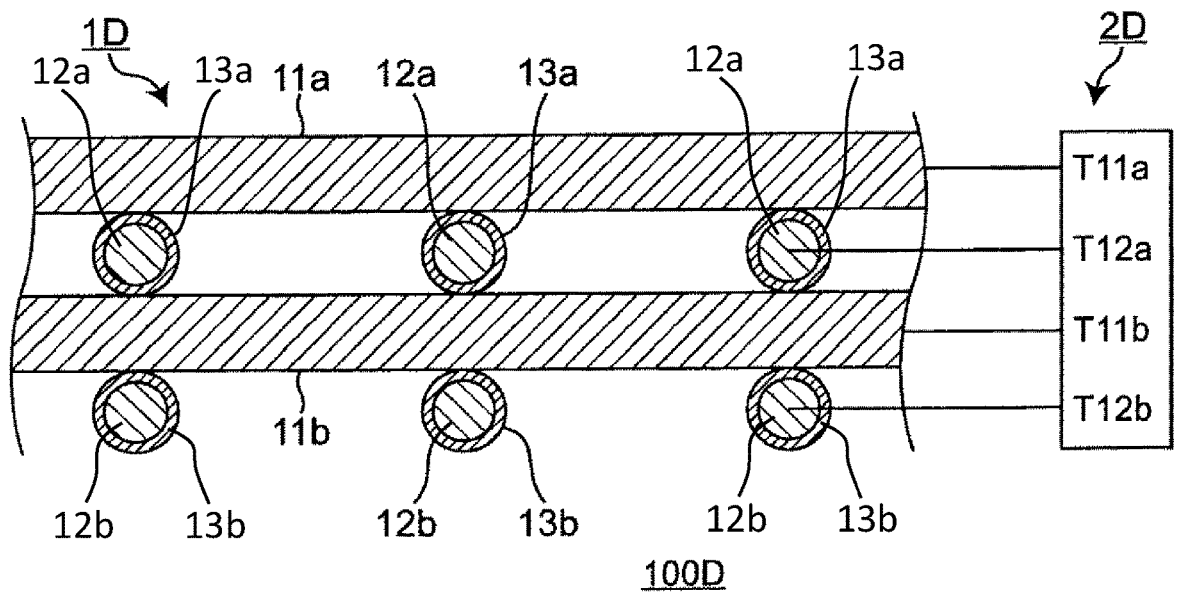
FIG. 4 is a sectional view schematically showing a configuration of a pressure-sensitive element according to a fourth exemplary embodiment of the present disclosure.

A configuration of pressure-sensitive element 100D according to the present exemplary embodiment is schematically shown in FIG. 4. That is, FIG. 4 is a sectional view schematically showing the configuration of pressure-sensitive element 100D according to the fourth exemplary embodiment. Pressure-sensitive element 100D according to the present exemplary embodiment is provided with pressure-sensitive part 1D that receives pressing force and detector 2D that detects the pressing force.

(4a) Pressure-Sensitive Part 1D

Pressure-sensitive part 1D is one exemplary embodiment of a configuration in which first conductive members and second conductive members are alternately stacked, and is the same as pressure-sensitive part 1A in the first exemplary embodiment except for the following item (1D-1).

(1D-1)

Pressure-sensitive part 1D is formed by repeatedly stacking first conductive member 11 and second conductive member 12 of pressure-sensitive part 1A. In FIG. 4, an upper first conductive member and a lower first conductive member are represented by reference marks 11a and 11b, respectively, and they may be independently selected from a range similar to the range of first conductive member 11 of pressure-sensitive part 1A. An upper second conductive member and a lower second conductive member are represented by reference marks 12a and 12b, respectively, and they may be independently selected from a range similar to the range of second conductive member 12 of pressure-sensitive part 1A. It is preferable that both second conductive member 12a and second conductive member 12b respectively have dielectric bodies 13a and 13b that completely cover the entire surfaces. Dielectric bodies 13a and 13b may be independently selected from a range similar to the range of dielectric body 13 of pressure-sensitive part 1A.

(4b) Detector 2D

Detector 2D is the same as detector 2A in the first exemplary embodiment except for the following item (2D-1).

(2D-1)

Detector 2D is electrically connected to wires leading from first conductive member 11a and first conductive member 11b and wires leading from second conductive members 12a and 12b via terminals T11a, T11b, T12a, and T12b, respectively. First conductive member 11a is preferably connected to ground of detector 2D from the viewpoint of stabilizing pressing force detection due to reduction in an influence of noise. Specifically, it is preferable that terminal T11a of detector 2D to which the wire leading from first conductive member 11a is electrically connected is further connected to ground.

FIG. 4 shows that detector 2D has only one terminal (terminal T12a or terminal T12b) to be electrically connected to the wire leading from one of a plurality of second conductive members 12a or one of a plurality of second conductive members 12b which is on each side of first conductive member 11b. However, detector 2D generally has a plurality of terminals T12a or a plurality of terminals T12b to be electrically connected to wires leading from the plurality of second conductive members 12a or the plurality of second conductive members 12b on each side of first conductive member 11b. That is, second conductive members 12a or second conductive members 12b on each side of first conductive member 11b are all connected to detector 2D via wires and terminals.

(4c) Measurement of Pressing Force with Pressure-Sensitive Element 100D

Pressure-sensitive element 100D according to the present exemplary embodiment can measure pressing force by measuring variations in electrostatic capacitance between various combinations of terminals.

For example, pressure-sensitive element 100D can measure pressing force by measuring one or more variations selected from the group consisting of a variation in electrostatic capacitance between terminal T12a and terminal T12b, a variation in electrostatic capacitance between terminal T11a and terminal T12b, a variation in electrostatic capacitance between terminal T11a and terminal T12a, a variation in electrostatic capacitance between terminal T12a and terminal T11b, and a variation in electrostatic capacitance between terminal T11b and terminal T12b.

From the viewpoint of improving pressure sensitivity, it is preferable that pressing force is measured by measuring two or more variations selected from the abovementioned group, preferably the variation in electrostatic capacitance between terminal T11a and terminal T12a and the variation in electrostatic capacitance between terminal T11b and terminal T12b.

Pressure-sensitive element 100D according to the present exemplary embodiment brings a further increase in an area of the contact region, whereby pressure sensitivity is further improved. In addition, measurement is performed between various combinations of terminals, and a difference in measured values is also detected. Thus, a variation in capacitance can be measured in more detailed manner.

When a variation in electrostatic capacitance is measured using terminal T12a and terminal T12b during measurement of variations in electrostatic capacitance between various combinations of terminals, a pressed position can also be detected together with pressing force in the present exemplary embodiment by allowing a principle direction of second conductive member 12a to cross a principle direction of second conductive member 12b. Measurement of a variation in electrostatic capacitance using terminal T12a and terminal T12b includes: measurement of only a variation in electrostatic capacitance between terminal T12a and terminal T12b; and measurement of a variation in electrostatic capacitance between terminals including one of terminal T12a and terminal T12b and a variation in electrostatic capacitance between terminals including the other one.

From the viewpoint of easily extending wires, pressing force is preferably measured by measuring only a variation in electrostatic capacitance between terminal T12a and terminal T12b.

Pressure-sensitive element 100D according to the present exemplary embodiment also measures a variation in electrostatic capacitance between the terminals based on a variation in an area of a contact region to thereby measure pressing force without deforming dielectric bodies 13a and 13b, and thus, enables measurement of a relatively wide range of pressing force with a relatively simple structure.

When the electrode having larger disturbing noise is set to have a potential of 0 V, pressure-sensitive element 100D according to the present exemplary embodiment is also resistant to noise, as in pressure-sensitive element 100B.

For example, when: only a variation in electrostatic capacitance between terminal T11a and terminal T11b is measured; only a variation in electrostatic capacitance between terminal T11a and terminal T12a is measured; and a variation in electrostatic capacitance between terminal T11a and terminal T12a and a variation in electrostatic capacitance between terminal T11b and terminal T12b are measured, first conductive member 11a is grounded (0 V potential). In such cases, when second conductive member 12b is also grounded (0 V potential), resistance to noise of the pressure-sensitive element is further improved.

Further, when only a variation in electrostatic capacitance between terminal T12a and terminal T12b is measured and when only a variation in electrostatic capacitance between terminal T12a and terminal T11b is measured, for example, second conductive member 12b is set to have a potential of 0 V. Thus, noise is prevented during the measurement of pressing force.

In addition, when opposing portions of the pressure-sensitive element are sandwiched between 0 V potentials, the pressure-sensitive element is resistant to external noise. Specifically, first conductive member 11a and second conductive member 12b are set to have a potential of 0 V. Thus, the pressure-sensitive element is resistant to noise.

Pressure-sensitive element 100D according to the present exemplary embodiment may have a base material same as base material 14 of pressure-sensitive element 100A under second conductive member 12b in FIG. 4.

Fifth Exemplary Embodiment

Figure 5:
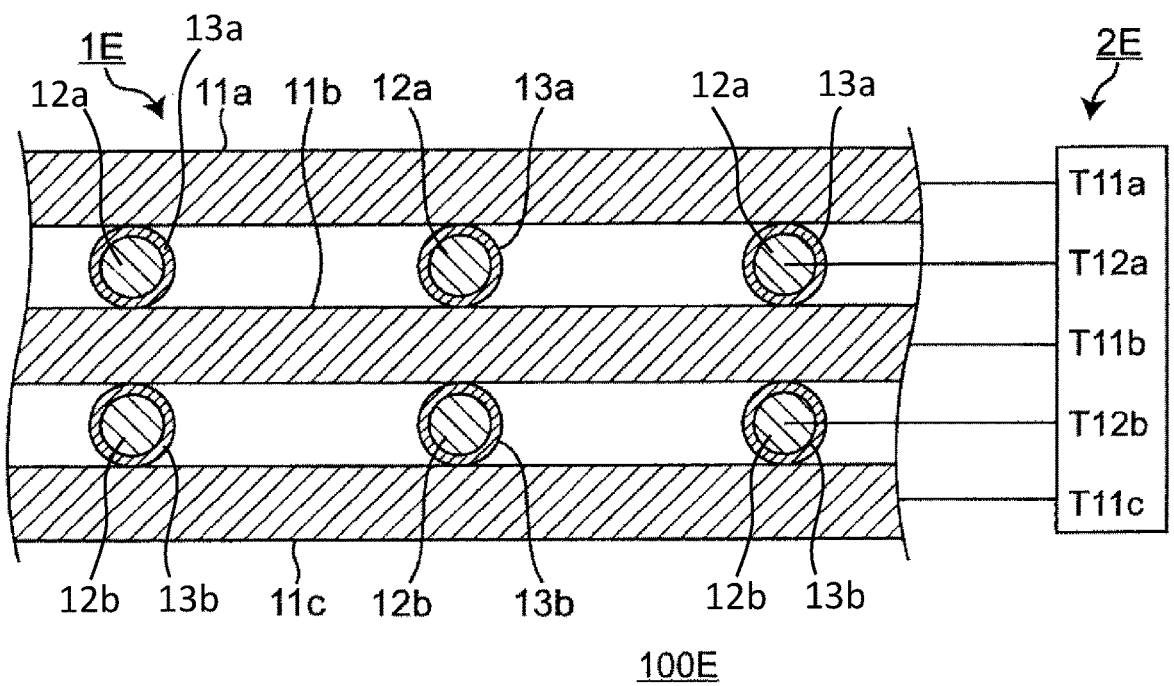
FIG. 5 is a sectional view schematically showing a configuration of a pressure-sensitive element according to a fifth exemplary embodiment of the present disclosure.

A configuration of pressure-sensitive element 100E according to the present exemplary embodiment is schematically shown in FIG. 5. That is, FIG. 5 is a sectional view schematically showing the configuration of pressure-sensitive element 100E according to the fifth exemplary embodiment. Pressure-sensitive element 100E according to the present exemplary embodiment is provided with pressure-sensitive part 1E that receives pressing force and detector 2E that detects the pressing force.

(5a) Pressure-Sensitive Part 1E

Pressure-sensitive part 1E is one exemplary embodiment of a configuration in which first conductive members and second conductive members are alternately stacked, and is the same as pressure-sensitive part 1D in the fourth exemplary embodiment except for the following item (1E-1).

(1E-1)

Pressure-sensitive part 1E further has first conductive member 11c under second conductive member 12b in FIG. 5. First conductive member 11c may be selected from a range similar to the range of first conductive member 11 of pressure-sensitive part 1A.

(5b) Detector 2E

Detector 2E is the same as detector 2D in the fourth exemplary embodiment except for the following item (2E-1).

(2E-1)

Detector 2E further has terminal T11c and is electrically connected to a wire leading from first conductive member 11c via terminal T11c.

(5c) Measurement of Pressing Force with Pressure-Sensitive Element 100E

Pressure-sensitive element 100E according to the present exemplary embodiment can measure pressing force by measuring variations in electrostatic capacitance between various combinations of terminals.

For example, pressure-sensitive element 100E can measure pressing force by measuring one or more variations selected from the group consisting of a variation in electrostatic capacitance between terminal T12a and terminal T12b, a variation in electrostatic capacitance between terminal T11a and terminal T11c, a variation in electrostatic capacitance between terminal T11a and terminal T12a, a variation in electrostatic capacitance between terminal T12a and terminal T11b, a variation in electrostatic capacitance between terminal T11b and terminal T12b, and a variation in electrostatic capacitance between terminal T12b and terminal T11c.

From the viewpoint of improving pressure sensitivity, it is preferable that pressing force is measured by measuring two or more variations selected from the abovementioned group, preferably the variation in electrostatic capacitance between terminal T11a and terminal T12a and the variation in electrostatic capacitance between terminal T11b and terminal T12b.

Pressure-sensitive element 100E according to the present exemplary embodiment can also measure a pressed position together with pressing force by measuring variations in electrostatic capacitance between various combinations of terminals. For example, when a variation in electrostatic capacitance is measured using terminal T12a and terminal T12b, a pressed position can be detected together with pressing force by allowing a principle direction of second conductive member 12a to cross a principle direction of second conductive member 12b. Note that measurement of a variation in electrostatic capacitance using terminal T12a and terminal T12b includes: measurement of only a variation in electrostatic capacitance between terminal T12a and terminal T12b; and measurement of a variation in electrostatic capacitance between terminals including one of terminal T12a and terminal T12b and a variation in electrostatic capacitance between terminals including the other one.

From the viewpoint of easily extending wires, pressing force is preferably measured by measuring only a variation in electrostatic capacitance between terminal T12a and terminal T12b.

Pressure-sensitive element 100E according to the present exemplary embodiment also measures a variation in electrostatic capacitance between the terminals based on a variation in an area of a contact region to thereby measure pressing force without deforming dielectric bodies 13a and 13b, and thus, enables measurement of a relatively wide range of pressing force with a relatively simple structure.

When the electrode having larger disturbing noise is grounded (0 V potential), pressure-sensitive element 100E according to the present exemplary embodiment is also resistant to noise, as in pressure-sensitive element 100B.

When only a variation in electrostatic capacitance between terminal T11a and terminal T11c is measured, for example, first conductive member 11a is grounded (0 V potential).

Further, when only a variation in electrostatic capacitance between terminal T11a and terminal T12a is measured and when a variation in electrostatic capacitance between terminal T11a and terminal T12a and a variation in electrostatic capacitance between terminal T11b and terminal T12b are measured, for example, first conductive member 11a is set to have a potential of 0 V. In such cases, when first conductive member 11c is also grounded (0 V potential), resistance to noise of the pressure-sensitive element is further improved.

In addition, when opposing portions of pressure-sensitive element 100E are sandwiched between 0 V potentials, the pressure-sensitive element 100E is resistant to external noise. Specifically, first conductive members 11a and 11c are grounded (0 V potential). Thus, noise is prevented during the measurement of pressing force.

Sixth Exemplary Embodiment

Figure 6A:
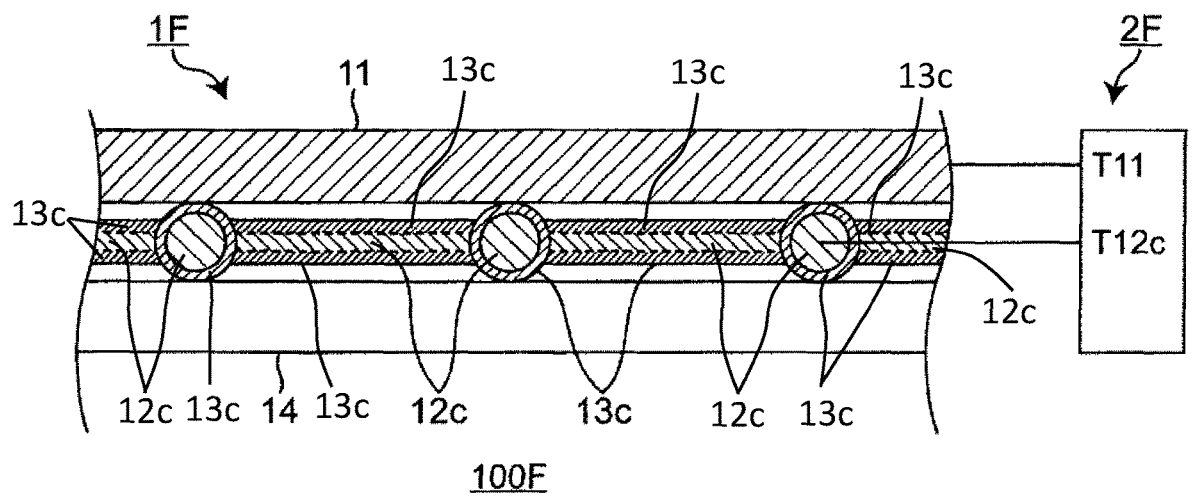
FIG. 6A is a sectional view schematically showing a configuration of a pressure-sensitive element according to a sixth exemplary embodiment of the present disclosure.
Figure 6B:
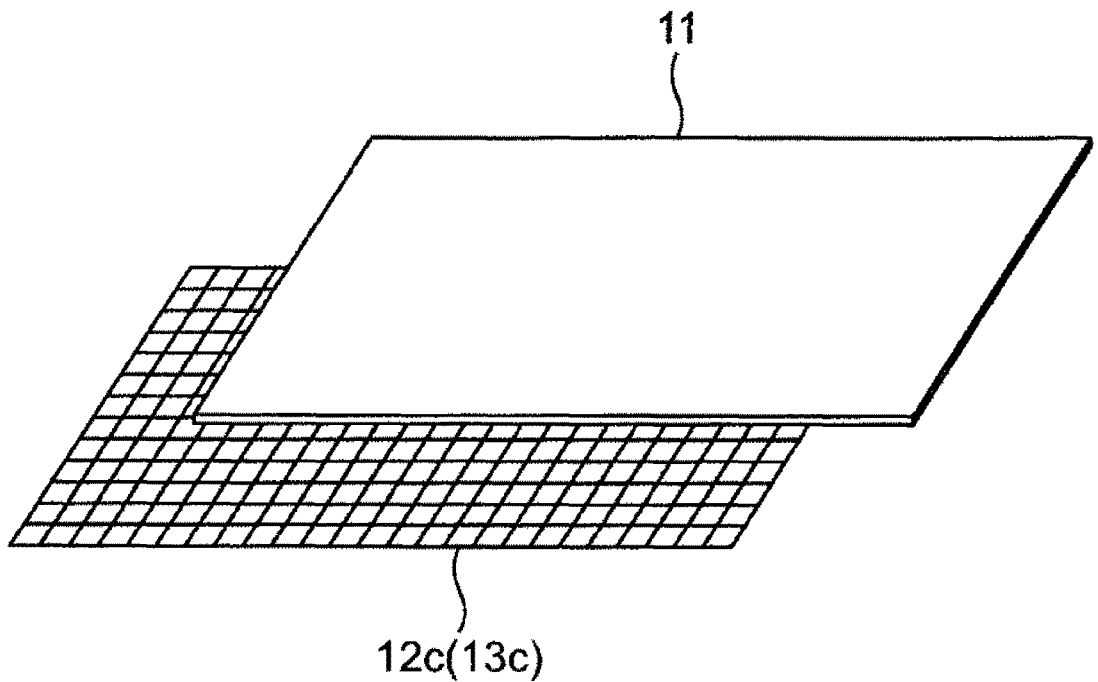
FIG. 6B is a plan view of a first conductive member and a second conductive member of the pressure-sensitive element shown in FIG. 6A, and schematically shows modes of the first conductive member and the second conductive member.

A configuration of pressure-sensitive element 100F according to the present exemplary embodiment is schematically shown in FIGS. 6A and 6B. That is, FIG. 6A is a sectional view schematically showing the configuration of the pressure-sensitive element according to the sixth exemplary embodiment. FIG. 6B is a plan view schematically showing first conductive member 11 and second conductive member 12c having dielectric body 13c in the pressure-sensitive element shown in FIG. 6A. Pressure-sensitive element 100F according to the present exemplary embodiment is provided with pressure-sensitive part 1F that receives pressing force and detector 2F that detects the pressing force.

(6a) Pressure-Sensitive Part 1F

Pressure-sensitive part 1F is the same as pressure-sensitive part 1A in the first exemplary embodiment except for the following items (1F-1) and (1F-2).

(1F-1)

Second conductive member 12c having a different shape is used. Specifically, second conductive member 12c may have a netlike shape (mesh shape) or a woven shape as shown in FIG. 6B. For example, the cross-sectional dimension of a line material constituting the netlike shape or woven shape may be within a range same as the range of the cross-sectional dimension of long second conductive member 12 of pressure-sensitive part 1A. The opening size of the netlike shape and the woven shape is not particularly limited. It is generally from 0.07 mm to 12 mm inclusive. When such second conductive member 12c is used in a steering device, the opening size is preferably from 1 mm to 12 mm inclusive, and by way of example, it is more preferably 2 mm. The opening size indicates a maximum size of a space in the shape in a plan view.

Second conductive member 12c is the same as second conductive member 12 of pressure-sensitive part 1A except for having a different shape. For example, a constituent material of second conductive member 12c may be selected from materials similar to the constituent materials of second conductive member 12 of pressure-sensitive part 1A.

(1F-2)

Dielectric body 13c covers the surface of such second conductive member 12c. It is preferable that dielectric body 13c completely covers the entire surface of second conductive member 12c as shown in FIGS. 6A and 6B. The coverage area of dielectric body 13c is not particularly limited, as long as dielectric body 13c at least partially covers the surface of second conductive member 12c. The state where dielectric body 13c at least partially covers the surface of second conductive member 12c indicates a state where dielectric body 13c covers at least an area between first conductive member 11 and second conductive member 12c in the surface of second conductive member 12c.

(6b) Detector 2F

Detector 2F is the same as detector 2A in the first exemplary embodiment except for the following item (2F-1).

(2F-1)

Detector 2F is electrically connected to a wire leading from first conductive member 11 and a wire leading from second conductive member 12c via terminals T11 and T12c, respectively.

(6c) Measurement of Pressing Force with Pressure-Sensitive Element 100F

Pressure-sensitive element 100F according to the present exemplary embodiment can measure pressing force by measuring a variation in electrostatic capacitance between terminal T11 and terminal T12c. Pressure-sensitive element 100F according to the present exemplary embodiment is useful as a pressure-sensitive element having a switch function, because second conductive member 12c has a netlike shape or a woven shape.

Pressure-sensitive element 100F also measures a variation in electrostatic capacitance between the terminals based on a variation in an area of a contact region to thereby measure pressing force without deforming dielectric body 13c, and thus, enables measurement of a relatively wide range of pressing force with a relatively simple structure.

In the present exemplary embodiment, the second conductive member has a netlike shape or a woven shape, so that the second conductive member is easy to use. Thus, improvement in manufacturing efficiency can be achieved.

Seventh Exemplary Embodiment

Figure 7:
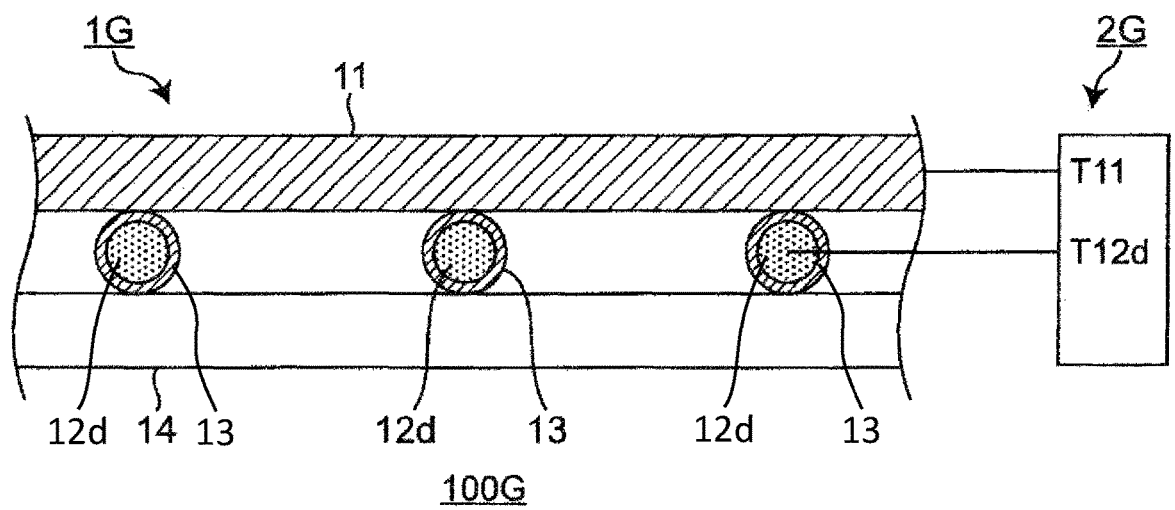
FIG. 7 is a sectional view schematically showing a configuration of a pressure-sensitive element according to a seventh exemplary embodiment of the present disclosure.

A configuration of pressure-sensitive element 100G according to the present exemplary embodiment is schematically shown in FIG. 7. That is, FIG. 7 is a sectional view schematically showing the configuration of the pressure-sensitive element according to the seventh exemplary embodiment. Pressure-sensitive element 100G according to the present exemplary embodiment is provided with pressure-sensitive part 1G that receives pressing force and detector 2G that detects the pressing force.

(7a) Pressure-Sensitive Part 1G

Pressure-sensitive part 1G is the same as pressure-sensitive part 1A in the first exemplary embodiment except for the following item (1G-1).

(1G-1)

Second conductive member 12d is formed from conductive rubber. The conductive rubber may be the same as the conductive rubber described as a constituent material of first conductive member 11 of pressure-sensitive part 1A. Second conductive member 12d has elasticity and conductivity, and functions as an electrode. Specifically, second conductive member 12d may have elasticity such that second conductive member 12d elastically deforms together with first conductive member 11 by application of pressing force to the pressure-sensitive part to increase an area of a contact region between first conductive member 11 and dielectric body 13. More specifically, first conductive member 11 of pressure-sensitive part 1G may have an elastic modulus within a range similar to the range of the elastic modulus of first conductive member 11 of pressure-sensitive part 1A. Second conductive member 12d may also have an elastic modulus within a range similar to the range of the elastic modulus of first conductive member 11 of pressure-sensitive part 1A. Regarding conductivity, a resistivity of second conductive member 12d may be sufficiently smaller than an impedance of capacitance within a desired frequency band. The resistivity can be adjusted by changing a relative proportion of the abovementioned conductive filler and rubber material.

(7b) Detector 2G

Detector 2G is the same as detector 2A in the first exemplary embodiment except for the following item (2G-1).

(2G-1)

Detector 2G is electrically connected to a wire leading from first conductive member 11 and a wire leading from second conductive member 12d via terminals T11 and T12d, respectively.

(7c) Measurement of Pressing Force with Pressure-Sensitive Element 100G

Pressure-sensitive element 100G according to the present exemplary embodiment can measure pressing force by measuring a variation in electrostatic capacitance between terminal T11 and terminal T12d.

In pressure-sensitive element 100G according to the present exemplary embodiment, dielectric body 13 entirely deforms with the deformation of second conductive member 12d, but the thickness of dielectric body 13 is unchanged. Therefore, pressure-sensitive element 100G according to the present exemplary embodiment also measures a variation in electrostatic capacitance between the terminals based on a variation in an area of a contact region to thereby measure pressing force, and thus, enables measurement of a relatively wide range of pressing force with a relatively simple structure.

Eighth Exemplary Embodiment

Figure 8:
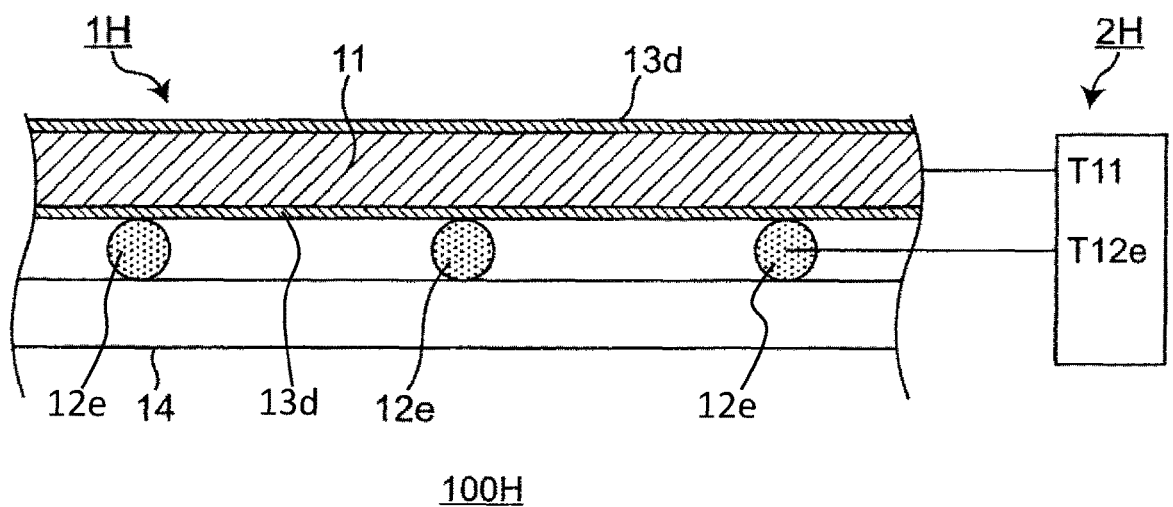
FIG. 8 is a sectional view schematically showing a configuration of a pressure-sensitive element according to an eighth exemplary embodiment of the present disclosure.

A configuration of pressure-sensitive element 100H according to the present exemplary embodiment is schematically shown in FIG. 8. That is, FIG. 8 is a sectional view schematically showing the configuration of pressure-sensitive element 100H according to the eighth exemplary embodiment. Pressure-sensitive element 100H according to the present exemplary embodiment is provided with pressure-sensitive part 1H that receives pressing force and detector 2H that detects the pressing force.

(8a) Pressure-Sensitive Part 1H

Pressure-sensitive part 1H is the same as pressure-sensitive part 1A in the first exemplary embodiment except for the following items (1H-1) and (1H-2).

(1H-1)

Second conductive member 12e is formed from conductive rubber. Second conductive member 12e is the same as second conductive member 12d in the seventh exemplary embodiment except that second conductive member 12e may have or may not have dielectric body 13 on its surface.

(1H-2)

First conductive member 11 has dielectric body 13d on its surface. Dielectric body 13d is the same as dielectric body 13 of pressure-sensitive part 1A except that dielectric body 13d is formed on the surface of first conductive member 11. For example, a constituent material of dielectric body 13d may be selected from materials similar to the constituent materials of dielectric body 13 of pressure-sensitive part 1A. Further, dielectric body 13d may have a thickness within a range similar to the range of the thickness of dielectric body 13 of pressure-sensitive part 1A, for example.

(8b) Detector 2H

Detector 2H is the same as detector 2A in the first exemplary embodiment except for the following item (2H-1).

(2H-1)

Detector 2H is electrically connected to a wire leading from first conductive member 11 and a wire leading from second conductive member 12e via terminals T11 and T12e, respectively.

(8c) Measurement of Pressing Force with Pressure-Sensitive Element 100H

Pressure-sensitive element 100H according to the present exemplary embodiment can measure pressing force by measuring a variation in electrostatic capacitance between terminal T11 and terminal T12e.

Pressure-sensitive element 100H according to the present exemplary embodiment also measures a variation in electrostatic capacitance between the terminals based on a variation in an area of a contact region to thereby measure pressing force without deforming dielectric body 13d, and thus, enables measurement of a relatively wide range of pressing force with a relatively simple structure.

Ninth Exemplary Embodiment

Figure 9A:
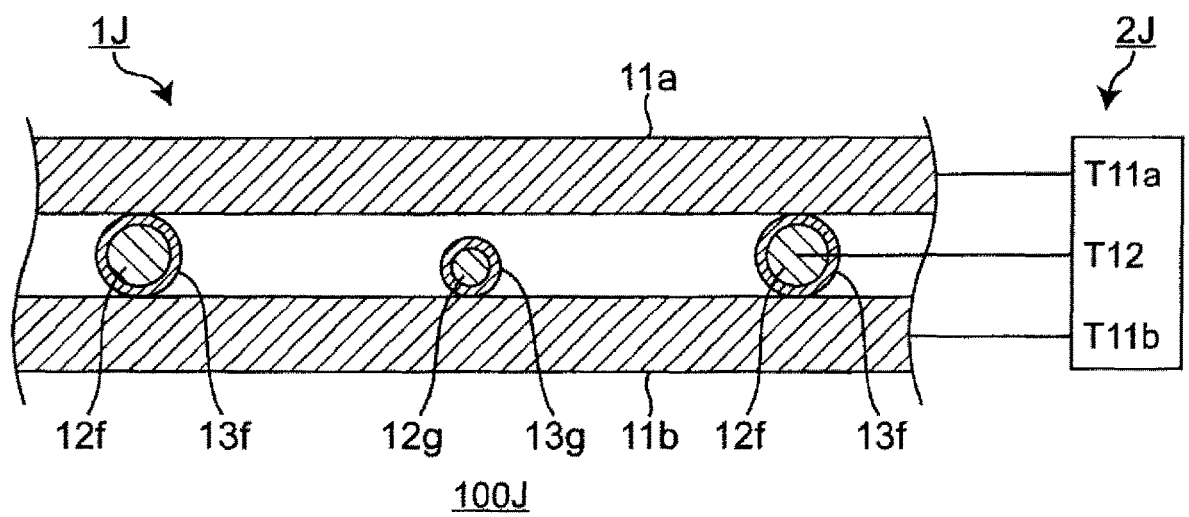
FIG. 9A is a sectional view schematically showing a configuration of a pressure-sensitive element according to a ninth exemplary embodiment of the present disclosure.

A configuration of pressure-sensitive element 100J according to the present exemplary embodiment is schematically shown in FIG. 9A. That is, FIG. 9A is a sectional view schematically showing the configuration of the pressure-sensitive element according to the ninth exemplary embodiment. Pressure-sensitive element 100J according to the present exemplary embodiment is provided with pressure-sensitive part 1J that receives pressing force and detector 2J that detects the pressing force.

(9a) Pressure-Sensitive Part 1J

Pressure-sensitive part 1J is the same as pressure-sensitive part 1A in the first exemplary embodiment except for the following items (1J-1) and (1J-2).

(1J-1)

Pressure-sensitive part 1J has two or more types of second conductive members having different cross-sectional dimensions. FIG. 9A shows two types of second conductive members 12f and 12g having different cross-sectional dimensions. The two or more types of second conductive members having different cross-sectional dimensions are the same as second conductive member 12 of pressure-sensitive part 1A except for having different cross-sectional dimensions. The cross-sectional dimension of each of the two or more types of second conductive members having different cross-sectional dimensions may be selected from a range similar to the range of the cross-sectional dimension of second conductive member 12 of pressure-sensitive part 1A. The two or more types of second conductive members (12f and 12g in FIG. 9A) having different cross-sectional dimensions preferably have dielectric bodies (13f and 13g in FIG. 9A) that completely cover the entire surfaces, respectively. The dielectric bodies (13f and 13g in FIG. 9A) provided to the two or more types of second conductive members (12f and 12g in FIG. 9A) having different cross-sectional dimensions may be selected from a range similar to the range of dielectric body 13 of pressure-sensitive part 1A.

(1J-2)

Pressure-sensitive part 1J has two first conductive members which hold second conductive members 12f and 12g from both sides. The two first conductive members of pressure-sensitive part 1J are represented by reference marks 11a and 11b in FIG. 9A, and they may be independently selected from a range similar to the range of first conductive member 11 of pressure-sensitive part 1A. First conductive members 11a and 11b are preferably formed from conductive rubber, and preferably have a sheet shape. The conductive rubber may be similar to the conductive rubber described as a constituent material of first conductive member 11 of pressure-sensitive part 1A.

(9b) Detector 2J

Detector 2J is the same as detector 2A in the first exemplary embodiment except for the following item (2J-1).

(2J-1)

Detector 2J is electrically connected to wires leading from first conductive members 11a and 11b and a wire leading from second conductive member 12f via terminals T11a, T11b, and T12, respectively. For example, two first conductive members 11a and 11b are electrically connected to each other via detector 2J. First conductive members 11a and 11b are preferably connected to ground of detector 2J from the viewpoint of stabilizing pressing force detection due to reduction in an influence of noise. Specifically, it is preferable that terminals T11a and T11b of detector 2J to which the wires leading from first conductive members 11a and 11b are electrically connected is further connected to ground.

In FIG. 9A, detector 2J has only one terminal T12 to be electrically connected to the wire leading from one of two or more types of second conductive members (12f and 12g) having different cross-sectional dimensions. However, detector 2J generally has a plurality of terminals T12 to be electrically connected to wires leading from the second conductive members (12f and 12g). That is, second conductive members (12f and 12g) are all connected to detector 2J via wires and terminals.

(9c) Measurement of Pressing Force with Pressure-Sensitive Element 100J

Pressure-sensitive element 100J according to the present exemplary embodiment can measure pressing force by measuring variations in electrostatic capacitance between various combinations of terminals.

For example, pressure-sensitive element 100J can measure pressing force by measuring one or more variations selected from the group consisting of a variation in electrostatic capacitance between terminal T11a and terminal T11b, a variation in electrostatic capacitance between terminal T11a and terminal T12, and a variation in electrostatic capacitance between terminal T12 and terminal T11b.

From the viewpoint of improving pressure sensitivity, it is preferable that pressing force is measured by measuring two or more variations selected from the abovementioned group, preferably the variation in electrostatic capacitance between terminal T11a and terminal T12 and the variation in electrostatic capacitance between terminal T12 and terminal T11b.

Pressure-sensitive element 100J according to the present exemplary embodiment also measures a variation in electrostatic capacitance between the terminals based on a variation in an area of a contact region to thereby measure pressing force without deforming the dielectric body, and thus, enables measurement of a relatively wide range of pressing force with a relatively simple structure.

Figure 9B:
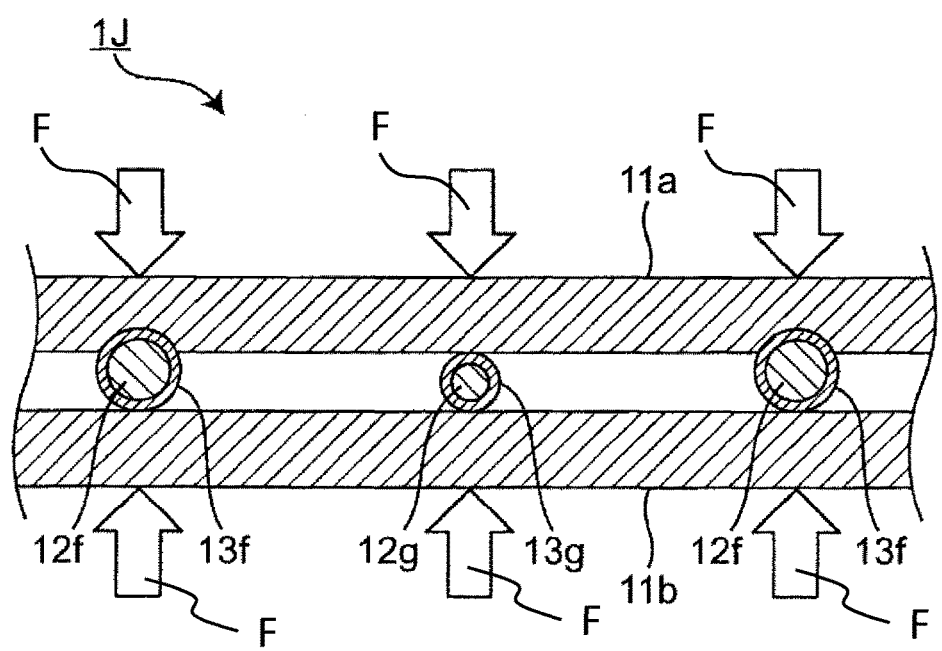
FIG. 9B is a sectional view schematically showing a configuration of a pressure-sensitive part of the pressure-sensitive element shown in FIG. 9A when pressing force is applied to the pressure-sensitive part.

FIG. 9B is a sectional view schematically showing a configuration of the pressure-sensitive part of the pressure-sensitive element shown in FIG. 9A when pressing force is applied to the pressure-sensitive part.

Pressure-sensitive element 100J according to the present exemplary embodiment uses two or more types of second conductive members having different cross-sectional dimensions, thereby being capable of further expanding the pressing force measurement range while improving pressure sensitivity. This is apparent from the fact that a variation in an area of a contact region can be still effectively caused after pressure-sensitive part 1J is in the state shown in FIG.

9B due to application of pressing force. FIG. 9B shows that the pressing force is applied from a side of first conductive member 11a, and force is also exerted from a side of first conductive member 11b due to reaction of the pressing force.

Tenth Exemplary Embodiment

Figure 10A:
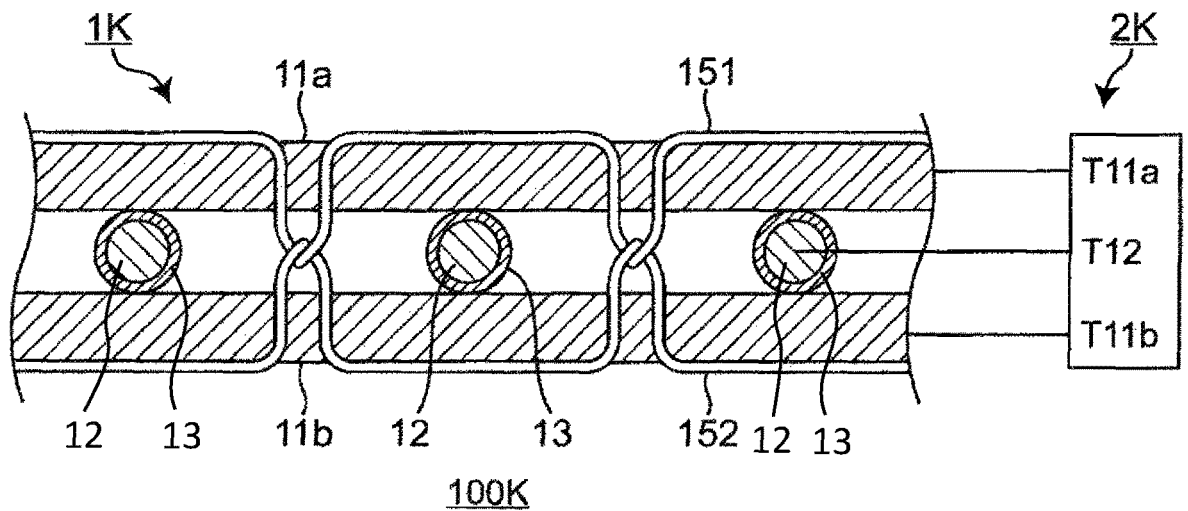
FIG. 10A is a sectional view schematically showing a configuration of a pressure-sensitive element according to a tenth exemplary embodiment of the present disclosure.

A configuration of pressure-sensitive element 100K according to the present exemplary embodiment is schematically shown in FIG. 10A. Pressure-sensitive element 100K according to the present exemplary embodiment is provided with pressure-sensitive part 1K that receives pressing force and detector 2K that detects the pressing force. FIG. 10A is a sectional view schematically showing the configuration of the pressure-sensitive element according to the tenth exemplary embodiment.
(10a) Pressure-Sensitive Part 1K Pressure-sensitive part 1K is the same as pressure-sensitive part 1B in the second exemplary embodiment except for the following item (1K-1).
(1K-1)

Pressure-sensitive part 1K has a restraint member for limiting displacement of second conductive member 12 in the pressure-sensitive part. The restraint member is composed of upper thread 151 and lower thread 152, and integrates first conductive members 11a and 11b and second conductive member 12 in a state where second conductive member 12 is disposed between first conductive member 11a and first conductive member 11b. An engagement part between the upper thread and the lower thread is located between first conductive member 11a and first conductive member 11b in FIG. 10A. However, it may be located inside first conductive member 11a or inside first conductive member 11b.
(10b) Detector 2K Detector 2K is the same as detector 2B in the second exemplary embodiment.
(10c) Measurement of Pressing Force with Pressure-Sensitive Element 100K Pressure-sensitive element 100K according to the present exemplary embodiment also measures a variation in electrostatic capacitance between terminals based on a variation in an area of a contact region to thereby measure pressing force without deforming the dielectric body, and thus, enables measurement of a relatively wide range of pressing force with a relatively simple structure.

Figure 10B:
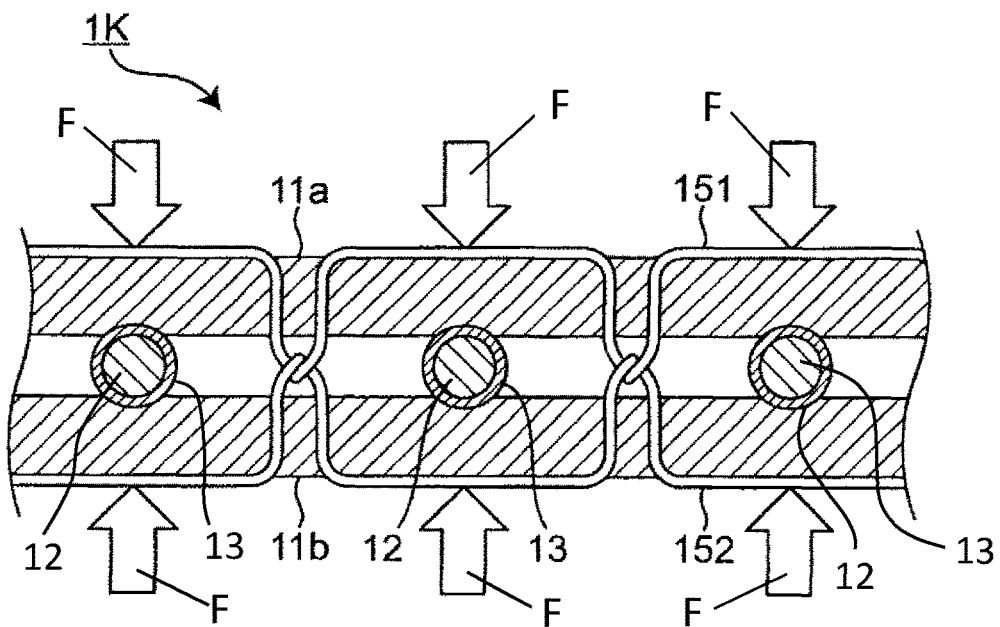
FIG. 10B is a sectional view schematically showing a configuration of a pressure-sensitive part of the pressure-sensitive element shown in FIG. 10A when pressing force is applied to the pressure-sensitive part.

FIG. 10B is a sectional view schematically showing a configuration of the pressure-sensitive part of the pressure-sensitive element shown in FIG. 10A when pressing force is applied to the pressure-sensitive part.

In pressure-sensitive element 100K according to the present exemplary embodiment, even when pressing force is applied to pressure-sensitive part 1K as shown in FIG. 10B, displacement of second conductive member 12 in pressure-sensitive part 1K is limited by upper thread 151 and lower thread 152, so that second conductive member 12 is maintained at a predetermined position with appropriate restraining force. Therefore, pressing force can be reliably detected on the predetermined position. In addition, when the pressure-sensitive element is mounted to a curved surface, distortion or the like is easy to be alleviated, and thus, damage can be prevented. FIG. 10B shows that the pressing force is applied from a side of first conductive member 11a, and force is also exerted from a side of first conductive member 11b due to reaction of the pressing force.

(First modification)

Figure 10C:
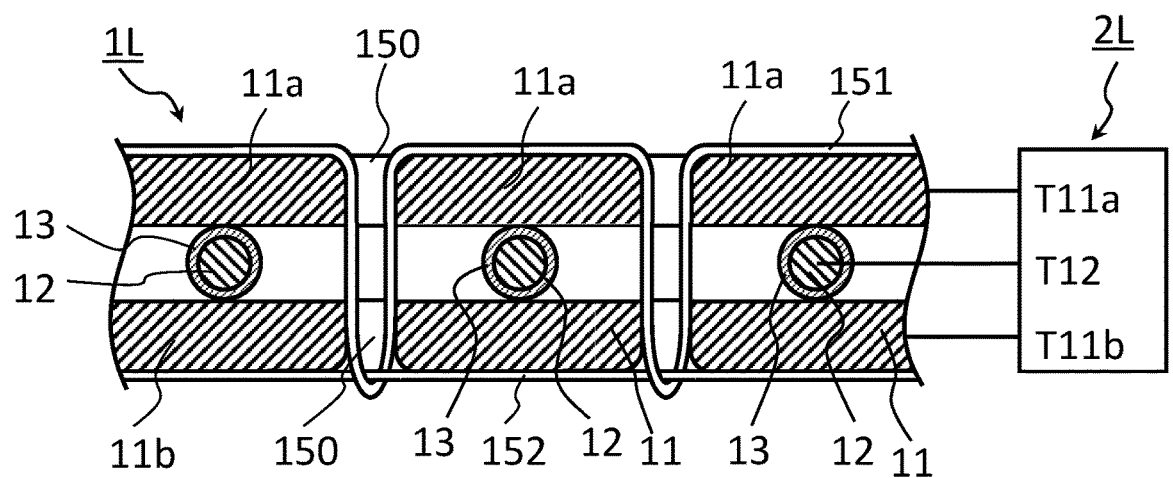
FIG. 10C is a sectional view schematically showing a configuration of another pressure-sensitive element according to the tenth exemplary embodiment of the present disclosure.

A configuration of pressure-sensitive element 100L according to a first modification of the present modification is schematically shown in FIG. 10C. That is, FIG. 10C is a sectional view schematically showing the configuration of pressure-sensitive element 100L. Pressure-sensitive element 100L according to the present exemplary embodiment is provided with pressure-sensitive part 1L that receives pressing force and detector 2L that detects the pressing force.
(10d) Pressure-Sensitive Part 1L Pressure-sensitive part 1L is the same as pressure-sensitive part 1K in the tenth exemplary embodiment except for the following item (1L-1).
(1L-1)

Pressure-sensitive part 1L has a restraint member for limiting displacement of second conductive member 12 in the pressure-sensitive part. The restraint member is composed of upper thread 151 and lower thread 152, and integrates first conductive members 11a and 11b and second conductive member 12 in a state where second conductive member 12 is disposed between first conductive member 11a and first conductive member 11b. Upper thread 151 is engaged with lower thread 152 on an outer surface side of first conductive member 11b via through hole 150 formed in first conductive member 11a and through hole 150 formed in first conductive member 11b. According to this configuration, upon stitching using upper thread 151 and lower thread 152 with through hole 150 being formed in first conductive member 11b, a mechanical load to be applied to first conductive member 11a and first conductive member 11b can be reduced, and the size of through hole 150 can also be reduced. Therefore, pressure-sensitive part 1L has excellent mechanical resistance to flexure.
(10e) Detector 2L Detector 2L is the same as detector 2B in the second exemplary embodiment.
(10f) Measurement of Pressing Force with Pressure-Sensitive Element 100L Pressure-sensitive element 100L according to the present modification also measures a variation in electrostatic capacitance between terminals based on a variation in an area of a contact region to thereby measure pressing force without deforming the dielectric body, and thus, enables measurement of a relatively wide range of pressing force with a relatively simple structure.

In pressure-sensitive element 100L according to the present modification even when pressing force is applied to pressure-sensitive part 1L, displacement of second conductive member 12 in pressure-sensitive part 1L is limited by upper thread 151 and lower thread 152, so that second conductive member 12 is maintained at a predetermined position with appropriate restraining force, as shown in FIG. 10C. Therefore, pressing force can be reliably detected on the predetermined position. In addition, when the pressure-sensitive element is mounted to a curved surface, distortion or the like is easy to be alleviated, and thus, damage can be prevented.

(Second Modification)

Figure 10D:
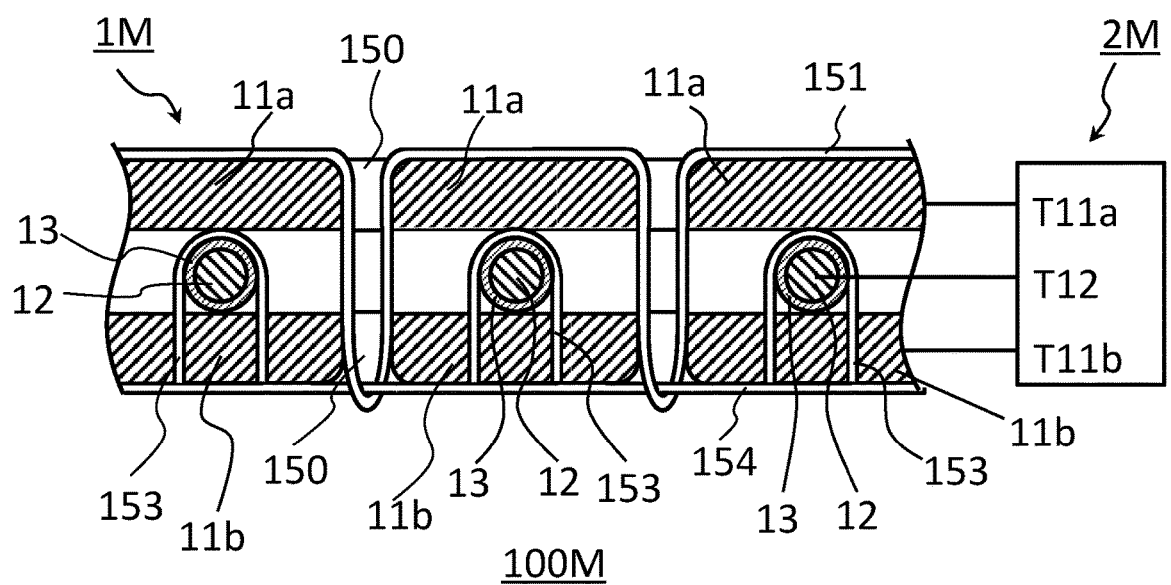
FIG. 10D is a sectional view schematically showing a configuration of still another pressure-sensitive element according to the tenth exemplary embodiment of the present disclosure.

A configuration of pressure-sensitive element 100M according to a second modification of the present exemplary embodiment is schematically shown in FIG. 10D. That is, FIG. 10D is a sectional view schematically showing the configuration of pressure-sensitive element 100M. Pressure-sensitive element 100M according to the present exemplary embodiment is provided with pressure-sensitive part 1M that receives pressing force and detector 2M that detects the pressing force.

(10g) Pressure-sensitive part 1M

Pressure-sensitive part 1M is the same as pressure-sensitive part 1L in the first modification except for the following item (1M-1).

(1M-1)

Pressure-sensitive part 1M has a restraint member for limiting displacement of second conductive member 12 in the pressure-sensitive part. The restraint member is composed of upper thread 151 and lower threads 153 and 154. Second conductive member 12 is fastened to first conductive member 11b with lower thread 153. First conductive member 11a and first conductive member 11b are stitched using upper thread 151 and lower thread 154. Upper thread 151 is engaged with lower thread 154 on an outer surface side of first conductive member 11b via through hole 150 formed in first conductive member 11a and through hole 150 formed in first conductive member 11b. Lower thread 153 for fastening second conductive member 12 to first conductive member 11b is a separate member from upper thread 151 and lower thread 154. With this configuration, second conductive member 12 can be positioned in advance with respect to first conductive member 11b, and during stitching using upper thread 151, displacement of second conductive member 12 can be prevented. Thus, during stitching using upper thread 151, damage on second conductive member 12 and dielectric body 13 can be prevented, whereby production yield and quality of pressure-sensitive part 1M are improved.

(10h) Detector 2M

Detector 2M is the same as detector 2B in the second exemplary embodiment.

(10i) Measurement of pressing force with pressure-sensitive element 100M

Pressure-sensitive element 100M according to the present modificaation also measures a variation in electrostatic capacitance between terminals based on a variation in an area of a contact region to thereby measure pressing force without deforming the dielectric body, and thus, enables measurement of a relatively wide range of pressing force with a relatively simple structure.

In pressure-sensitive element 100M according to the present modification, even when pressing force is applied to pressure-sensitive part 1M, displacement of second conductive member 12 in pressure-sensitive part 1K is limited by upper thread 151 and lower thread 152, so that second conductive member 12 is maintained at a predetermined position with appropriate restraining force, as shown in FIG. 10D. Therefore, pressing force can be reliably detected on the predetermined position. In addition, when the pressure-sensitive element is mounted to a curved surface, strain or the like is easy to be alleviated, and thus, damage can be prevented.

Eleventh Exemplary Embodiment

The present exemplary embodiment includes a mode in which, in the first to tenth exemplary embodiments described above, first conductive member (11, 11a, 11b, 11c) has a plurality of projections on a side facing second conductive member (12, 12a, 12b). In the present exemplary embodiment, the second conductive member generally has dielectric body 13 covering its surface. It is preferable that the dielectric body provided to the second conductive member completely covers the entire surface of the second conductive member.

Figure 11A:
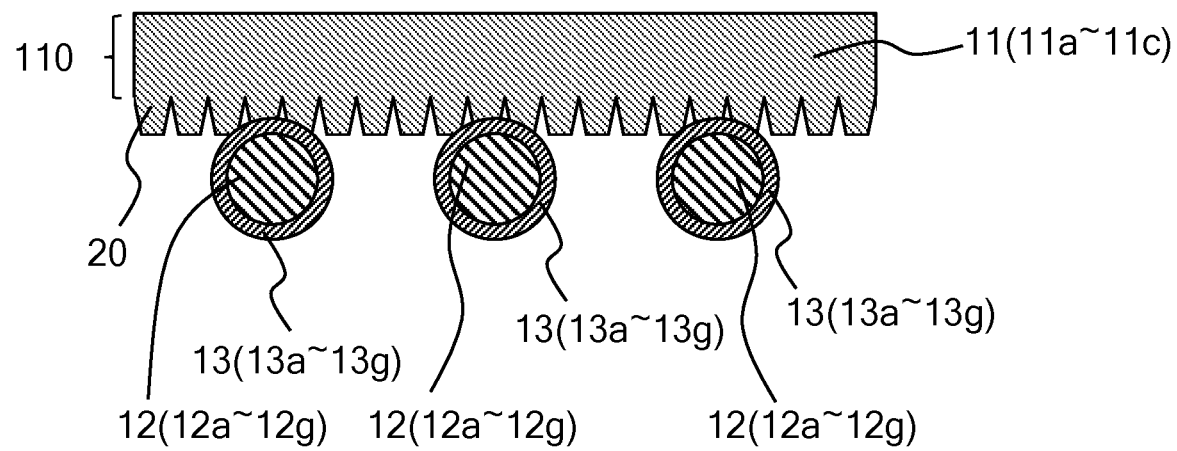
FIG. 11A is an enlarged sectional view schematically showing a first conductive member and a second conductive member having a dielectric body on its surface in an example of a pressure-sensitive element according to an eleventh exemplary embodiment of the present disclosure.
Figure 11B:
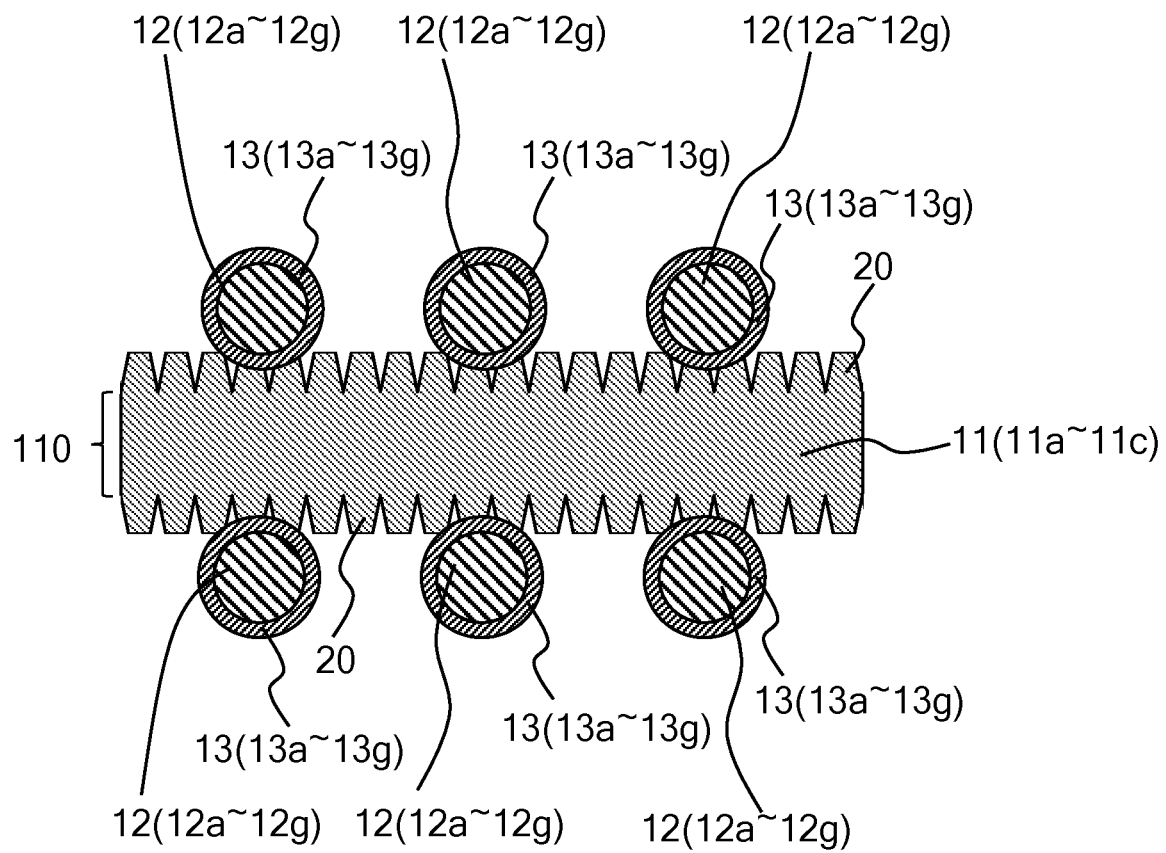
FIG. 11B is an enlarged sectional view schematically showing a first conductive member and a second conductive member having a dielectric body on its surface in another example of the pressure-sensitive element according to the eleventh exemplary embodiment of the present disclosure.

When the first conductive member has a plurality of projections 20 on the side facing the second conductive member as shown in FIGS. 11A and 11B, pressure sensitivity is improved. Specifically, when pressing force is applied to the pressure-sensitive part, a variation in an area of a contact region between the first conductive member and the dielectric body increases, and therefore, pressure sensitivity is improved. When the pressure sensitivity is improved, very small pressing force which has been conventionally difficult to be detected can be detected, for example. Thus, the start of application of pressing force can be detected with high precision.

FIG. 11A is an enlarged sectional view schematically showing a first conductive member and a second conductive member which has dielectric body 13 formed on its surface in an example of a pressure-sensitive element according to the eleventh exemplary embodiment. In FIG. 11A, the first conductive member has a plurality of projections 20 on one surface. Such a first conductive member can correspond to the first conductive members described below.

First conductive member 11 in FIGS. 1A, 6A, and 7

First conductive members 11a and 11b in FIGS. 2, 9A, and 10A

First conductive member 11a in FIG. 4

First conductive members 11a and 11c in FIG. 5

First conductive members 11a and 11b in FIGS. 9A and 10A

FIG. 11B is an enlarged sectional view schematically showing a first conductive member and a second conductive member which has dielectric body 13 formed on its surface in another example of the pressure-sensitive element according to the eleventh exemplary embodiment. In FIG. 11B, the first conductive member has a plurality of projections 20 on both surfaces. Such a first conductive member can correspond to the first conductive members described below.

First conductive member 11 in FIG. 3

First conductive member 11b in FIGS. 4 and 5

First conductive member 11 (11a to 11c) in the present exemplary embodiment is the same as the first conductive members in the abovementioned exemplary embodiments except for having projections 20. In the present exemplary embodiment, second conductive member 12 (12a to 12g), dielectric body 13 (13a to 13g), and other configurations are the same as those in the abovementioned exemplary embodiments.

Projections 20 are generally formed from a material similar to the material of the first conductive member, preferably conductive rubber. Projections 20 generally have elasticity and conductivity similar to those of the first conductive member. As shown in FIGS. 11A and 11B, for example, projections 20 project toward the side where second conductive member 12 and dielectric body 13 are disposed from base part 110 of first conductive member 11. In other words, first conductive member 11 has a protruding and recessed pattern which locally protrudes and is recessed on the surface facing second conductive member 12 and dielectric body 13. A number of projections 20 on first conductive member 11 is generally at least one. Two or more projections 20 may be provided, and accordingly, first conductive member 11 may have a plurality of projections 20. According to the mode having the plurality of projections 20, first conductive member 11 has a protruding and recessed pattern on the entire surface, and protrusions in the protruding and recessed pattern correspond to projections 20. Base part 110 of first conductive member 11 indicates an area having no projections.

Each of projections 20 on first conductive member 11 may have a tapered shape. Specifically, each of projections 20 on first conductive member 11 may have a tapered shape in which the width thereof gradually decreases toward the tip (see FIGS. 11A and 11B). As shown in FIGS. 11A and 11B, projections 20 may be generally a frustum, such as a conical frustum or a square frustum, for example.

Projections 20 may have any height, as long as electrostatic capacitance between first conductive member 11 and second conductive member 12 varies due to external pressing force. In addition, the plurality of projections 20 may be regularly arrayed. Further, a pitch between projections 20 is not particularly limited, as long as electrostatic capacitance between first conductive member 11 and second conductive member 12 varies due to external pressing force. It is to be noted that, when first conductive member 11 has projections 20, first conductive member 11 to be used herein indicates first conductive member 11 with projections 20. That is, projections 20 constitute a part of first conductive member 11. Therefore, the thickness of first conductive member 11 includes the height of projections 20.

Generally, the plurality of projections 20 is formed on the surface of first conductive member 11 having a sheet shape. The elastic moduli of the plurality of projections 20 may locally vary according to the formation position on the sheet shape. With this configuration, very small pressing force can be measured, whereby pressure sensitivity is improved.

The elastic modulus of one projection 20 may locally vary in the height direction. Thus, linearity of sensitivity can be designed, whereby the pressure-sensitive element can be highly sensitive with linearity. The linearity herein means that the value of pressing force is proportional to the measured value of electrostatic capacitance. If the pressure-sensitive element has linearity, the value of pressing force can be obtained with high accuracy.

Projections 20 can be formed by performing the following processes in the method for manufacturing first conductive member 11 described in the first exemplary embodiment. That is, when a resin material (rubber material) solution, a raw material solution, or a composite material which has been applied is dried or cured, a process for pressing a mold having a desired protruding and recessed pattern is performed. With this process, first conductive member 11 having projections 20 is formed. According to the shape of the protruding and recessed pattern of the mold to be used, a plurality of pillar-shaped projections may have a variety of shapes (for example, cylindrical shape, conical shape, conical frustum shape, square frustum shape, hemisphere shape, or lattice shape).

First conductive member 11 having projections 20 can be obtained using a nanoimprint technology. The nanoimprint technology indicates a technology for transferring a protruding and recessed pattern formed on a mold onto a resin body which is a transferred body in nanometer scales by pressing the mold against the resin body. Such technology enables formation of three-dimensional structures having finer pattern and inclined parts, such as a cone, as compared to a lithography technology. With the nanoimprint technology, the entire shape of first conductive member 11 and height of the projections can be easily controlled by using a mold having a prescribed desired protruding and recessed pattern. Similarly, the shape of the projections can also be easily controlled with the nanoimprint technology. According to the control of the shape of the projections, a variation in a contact area between projections 20 and dielectric body 13 (variation in the contact area when pressing force is applied) can be particularly mitigated in the pressure-sensitive element. That is, a variation in capacitance when pressing force is applied can be controlled, whereby a pressure-sensitive element capable of detecting pressing force with high precision can be achieved.

[Use of Pressure-Sensitive Element According to the Present Disclosure]

The pressure-sensitive element according to the present disclosure is preferably usable as sensor elements used for various types of management systems and various types of electronic devices.

Examples of management systems include stockout management systems (shopping baskets, physical distribution management, refrigerator-related articles), vehicle management systems (seats, steering devices, switches (that can receive analog inputs) around consoles), coaching management systems (shoes, clothes), security management systems (all contact parts), and nursing care/childcare management systems (articles related to functional bedding). The vehicle management systems can discreetly detect an operating state to read the condition of a driver (drowsiness, state of mind, etc.) and give feedback. The coaching systems can read the center of gravity of a human body or a load distribution and bring a user into a comfortable state instantaneously. The security management systems can simultaneously read the weight, length of stride, passage speed, and shoe sole pattern when a person passes, and can identify the person through comparison with data, for example.

Examples of electronic devices include vehicle-mounted devices (car navigation systems, audio devices, etc.), home electrical appliances (electric pots, induction heating (IH) cooking heaters, etc.), smartphones, electronic paper, and electronic book readers. When being applied to various types of management systems and various types of electronic devices described above, the pressure-sensitive element according to the present disclosure can be used as a touch sensor element (pressure-sensitive sheet, operation panel, operation switch, etc.) that is more convenient to users than ever.

Twelfth Exemplary Embodiment

Figure 12:
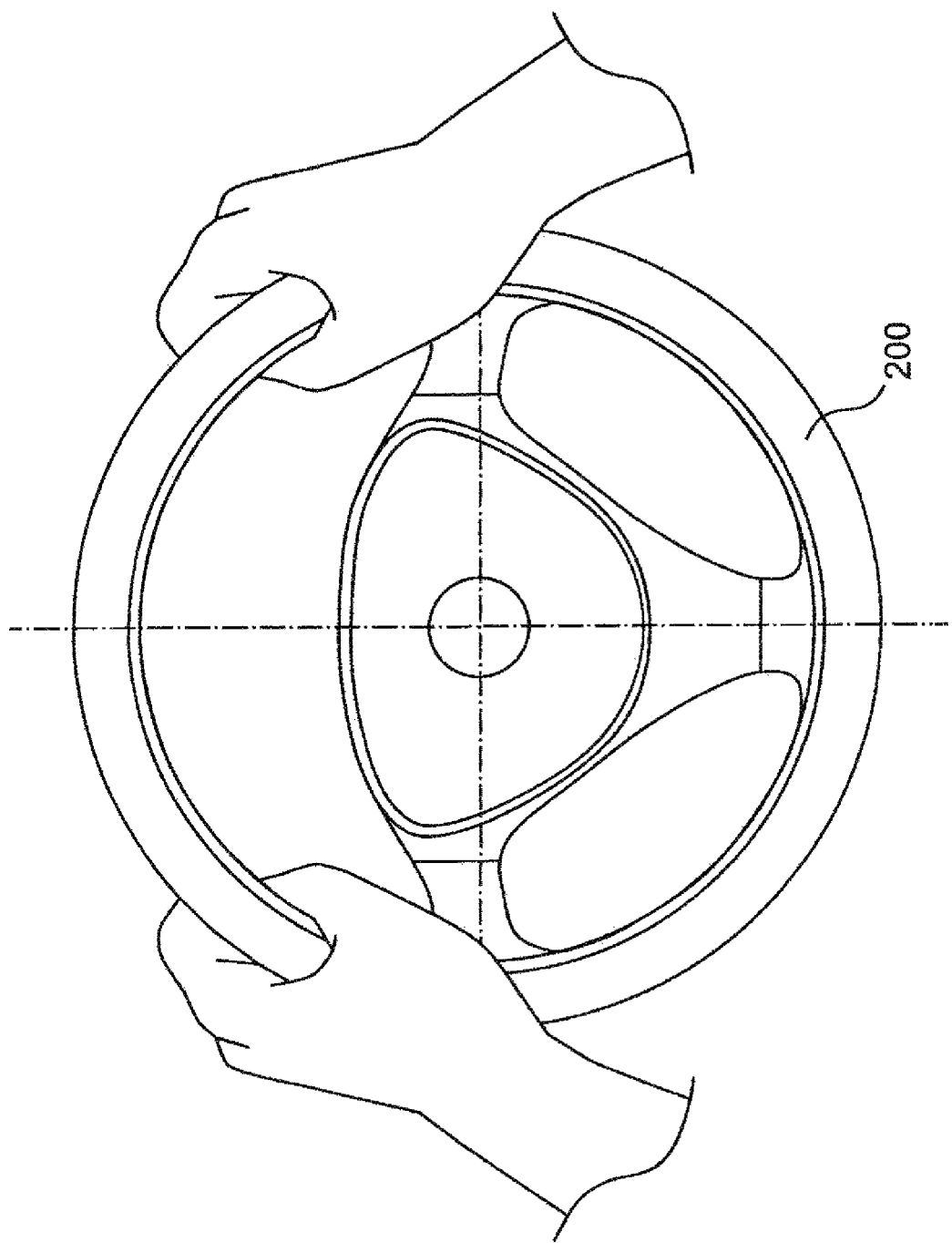
FIG. 12 is a plan view schematically showing one example of a steering device (steering wheel), according to a twelfth exemplary embodiment, to which the pressure-sensitive element according to the present disclosure is applicable.

An example where the pressure-sensitive element in the present disclosure is applied to, for example, a steering device of a moving body is described in detail in a twelfth exemplary embodiment. Examples of the moving body include automobiles, ships, and airplanes. A steering wheel shown in FIG. 12 is used as the steering device, for example. In FIG. 12, the steering wheel has grip part 200. In this case, the pressure-sensitive element is preferably disposed on a portion where fingers of a human are placed when the human grips grip part 200 with his/her hands. In this configuration, the pressure-sensitive element may be preferably provided in consideration of the front-back direction of the pressure-sensitive element such that pressing force is applied from the first conductive member to the second conductive member. The pressure-sensitive part of the pressure-sensitive element is generally disposed such that, in a positional relationship between first conductive member 11 and second conductive member 12, first conductive member 11 is on an external side and second conductive member 12 is on an internal side.

Figure 13A:
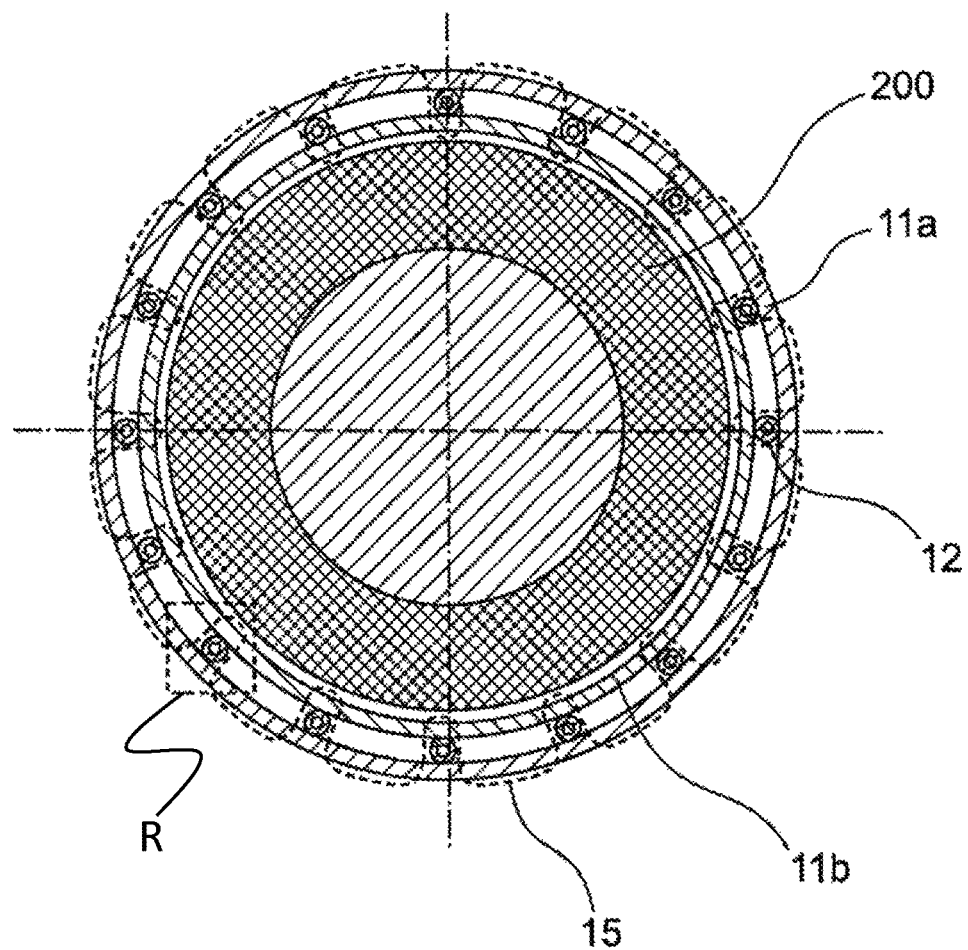
FIG. 13A is a sectional view schematically showing one example of the steering device (steering wheel), according to the twelfth exemplary embodiment, to which the pressure-sensitive element according to the present disclosure is applied.
Figure 13B:
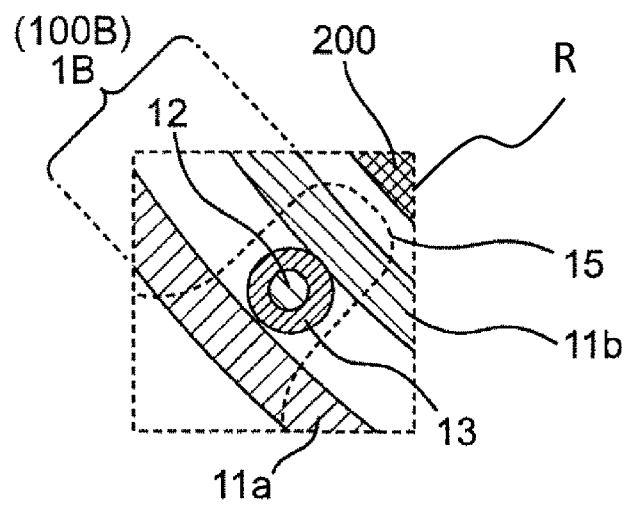
FIG. 13B is an enlarged sectional view of part R of the steering device shown in FIG. 13A.

More specifically, FIGS. 13A and 13B show an exemplary embodiment where pressure-sensitive element 100B according to the second exemplary embodiment is applied to a steering wheel of an automobile as the pressure-sensitive element according to the present disclosure. Pressure-sensitive part 1B of pressure-sensitive element 100B is mounted to an outer curved surface of grip part 200 of the steering wheel as shown in FIGS. 13A and 13B. In this case, pressure-sensitive part 1B is disposed such that, in the positional relationship between first conductive member 11a and second conductive member 12, first conductive member 11a is on an external side and second conductive member 12 is on an internal side. More specifically, pressure-sensitive part 1B is mounted in such a way that the outer surface of first conductive member 11b is in contact with the outer curved surface of grip part 200.

A method for mounting the pressure-sensitive element is not particularly limited, as long as the pressure-sensitive part is fixed to the grip part, and a method using an adhesive is useful, for example. Although there seems to be a gap between the outer surface of first conductive member 11b and the outer curved surface of grip part 200 in FIGS. 13A and 13B, the gap is usually filled with the adhesive.

In detector 2B (not shown) of the pressure-sensitive element, terminal T11a to which first conductive member 11a is electrically connected is preferably connected to ground of a main body of the moving body.

The pressure-sensitive element according to the present disclosure is preferably usable as sensor elements used for various types of management systems and various types of electronic devices described above. When being applied to various types of management systems and various types of electronic devices described above, the pressure-sensitive element according to the present disclosure can be used as a touch sensor element (pressure-sensitive sheet, operation panel, operation switch, etc.) that is more convenient to users than ever.

The invention claimed is:

1. A pressure-sensitive element comprising:
a pressure-sensitive part that receives pressing force; and
a detector that detects the pressing force,
wherein the pressure-sensitive part includes:
   a first conductive member having elasticity;
   a second conductive member; and
   a dielectric body that is disposed between the first conductive member and the second conductive member and at least partially covers one of a surface of the first conductive member and a surface of the second conductive member,
the second conductive member is one of a metal line and a metal wire, and
the detector detects the pressing force based on a variation in electrostatic capacitance between the first conductive member and the second conductive member, the variation in the electrostatic capacitance is caused by varying an area of contact between the first conductive member and the second conductive member.

2. The pressure-sensitive element according to claim 1, wherein, when the pressing force is applied to the pressure-sensitive part, one of an area of a contact region between the first conductive member and the dielectric body and an area of a contact region between the second conductive member and the dielectric body increases based on the elasticity of the first conductive member, and the electrostatic capacitance varies.

3. The pressure-sensitive element according to claim 1, wherein the dielectric body has rigidity.

4. The pressure-sensitive element according to claim 1, further comprising a restraint member that limits displacement of the second conductive member in the pressure-sensitive part.

5. The pressure-sensitive element according to claim 1, wherein the first conductive member comprises sheet-shaped conductive rubber.

6. The pressure-sensitive element according to claim 1, wherein the second conductive member is a long member.

7. The pressure-sensitive element according to claim 1, wherein the second conductive member is a flexible long member.

8. The pressure-sensitive element according to claim 1, wherein the second conductive member is composed of two or more types of long members having different cross-sectional dimensions.

9. The pressure-sensitive element according to claim 1, wherein the second conductive member is a metal having one of a netlike shape and a woven shape.

10. The pressure-sensitive element according to claim 1, wherein the second conductive member has elasticity.

11. The pressure-sensitive element according to claim 1, wherein
the dielectric body constitutes an insulating film of the second conductive member, and
the dielectric body and the second conductive member constitute an insulation-coated metal wire.

12. The pressure-sensitive element according to claim 1, wherein the dielectric body has a thickness ranging from 20 nm to 2 mm.

13. The pressure-sensitive element according to claim 1, wherein
the pressure-sensitive part has two of the first conductive members that hold the second conductive member from both sides,
the second conductive member has the dielectric body covering a surface, and
the two of the first conductive members are electrically connected to each other.

14. The pressure-sensitive element according to claim 1, wherein the pressure-sensitive part has a structure in which the first conductive member and the second conductive member are alternately stacked.

15. A steering device provided to a moving body, the steering device comprising:
a grip part; and
the pressure-sensitive element according to claim 1, the pressure-sensitive element being mounted on a surface part of the grip part.

16. A pressure-sensitive element comprising:
a pressure-sensitive part that receives pressing force; and
a detector that detects the pressing force, wherein the pressure-sensitive part includes:
a first conductive member having elasticity;
a second conductive member; and
a dielectric body that is disposed between the first conductive member and the second conductive member and at least partially covers one of a surface of the first conductive member and a surface of the second conductive member,
the second conductive member is one of a metal line and a metal wire, and
the detector detects the pressing force based on a variation in electrostatic capacitance between the first conductive member and the second conductive member, further comprising
a restraint member that limits displacement of the second conductive member in the pressure-sensitive part, wherein
the restraint member is a thread member.

17. The pressure-sensitive element according to claim 16, wherein the thread member is composed of an upper thread and a lower thread.

18. A pressure-sensitive element comprising:
a pressure-sensitive part that receives pressing force; and
a detector that detects the pressing force, wherein the pressure-sensitive part includes:
a first conductive member having elasticity;
a second conductive member; and
a dielectric body that is disposed between the first conductive member and the second conductive member and at least partially covers one of a surface of the first conductive member and a surface of the second conductive member,
the second conductive member is one of a metal line and a metal wire, and the detector detects the pressing force based on a variation in electrostatic capacitance between the first conductive member and the second conductive member, wherein
the first conductive member has a plurality of projections on a side facing the second conductive member.

19. A pressure-sensitive element comprising:
a pressure-sensitive part that receives pressing force; and
a detector that detects the pressing force, wherein the pressure-sensitive part includes:
a first conductive member having elasticity;
a second conductive member; and
a dielectric body that is disposed between the first conductive member and the second conductive member and at least partially covers one of a surface of the first conductive member and a surface of the second conductive member,
the second conductive member is one of a metal line and a metal wire, and
the detector detects the pressing force based on a variation in electrostatic capacitance between the first conductive member and the second conductive member, wherein the second conductive member is a heater element of the pressure-sensitive element.

* * * * *